(12) United States Patent
Shibahara et al.

(10) Patent No.: US 6,538,768 B2
(45) Date of Patent: *Mar. 25, 2003

(54) IMAGE PROCESSING APPARATUS AND METHOD THEREOF AND STORING MEDIUM

(75) Inventors: Yasuko Shibahara, Inagi (JP); Atsushi Shoji, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 73 days.

(21) Appl. No.: 09/092,269

(22) Filed: Jun. 5, 1998

(65) Prior Publication Data

US 2001/0043341 A1 Nov. 22, 2001

(30) Foreign Application Priority Data

Jun. 18, 1997 (JP) .............................................. 9-161197
Jul. 16, 1997 (JP) .............................................. 9-191518

(51) Int. Cl.$^7$ ................................................ H04N 1/46
(52) U.S. Cl. ........................................ 358/1.9; 382/286
(58) Field of Search ........................... 358/1.9, 445–447, 358/534, 535; 382/173–176, 286, 232, 237, 270

(56) References Cited

U.S. PATENT DOCUMENTS

| | | | | |
|---|---|---|---|---|
| 4,674,861 A | * | 6/1987 | Kawamura ..................... 355/4 |
| 5,978,554 A | * | 6/1987 | Hakamada et al. .......... 395/109 |
| 5,109,436 A | * | 4/1992 | Machida et al. ............... 382/50 |
| 5,280,546 A | * | 1/1994 | Machida et al. ............... 382/47 |
| 5,295,000 A | | 3/1994 | Nonoshita et al. ........... 358/444 |
| 5,446,715 A | | 8/1995 | Satomura ...................... 369/49 |
| 5,557,412 A | | 9/1996 | Saito et al. .................. 358/296 |
| 5,568,571 A | * | 10/1996 | Willis et al. ................. 382/254 |
| 5,701,364 A | * | 12/1997 | Kanno ......................... 382/176 |
| 5,719,955 A | | 2/1998 | Mita ............................ 382/158 |
| 5,832,122 A | * | 11/1998 | Shimazaki ................... 382/237 |
| 5,841,552 A | | 11/1998 | Atobe et al. ................. 358/447 |
| 2001/0005414 A1 | * | 6/2001 | Shimada ...................... 713/168 |

FOREIGN PATENT DOCUMENTS

JP  1-286674  1/1989  .......... H04N/1/387

* cited by examiner

Primary Examiner—Thomas D. Lee
Assistant Examiner—Stephen Brinich
(74) Attorney, Agent, or Firm—Fitzpatrick, Cella, Harper & Scinto

(57) ABSTRACT

In order to detect a forgery of a document formed from an input image, additional information is added to the input image using general image processing without including a specific information adding section in a general image processing unit. M-value image data is input and converted to N-value image data, wherein the value M is larger than the value N, on the basis of threshold table groups composed of plural kinds of threshold tables whose using order is determined so as to indicate the predetermined additional information which is embedded in the image, and is used for detecting the forgery.

12 Claims, 24 Drawing Sheets

FIG. 1

| 254 | 235 | 187 | 139 | 131 | 175 | 223 | 251 |
|---|---|---|---|---|---|---|---|
| 239 | 207 | 155 | 95 | 87 | 143 | 203 | 231 |
| 195 | 159 | 75 | 47 | 39 | 59 | 151 | 191 |
| 147 | 91 | 43 | 15 | 11 | 31 | 79 | 135 |
| 127 | 83 | 35 | 7 | 3 | 23 | 71 | 119 |
| 171 | 115 | 55 | 27 | 19 | 51 | 103 | 163 |
| 219 | 199 | 107 | 67 | 63 | 99 | 183 | 211 |
| 247 | 227 | 179 | 123 | 111 | 167 | 215 | 243 |

FIG. 2

| 75 | 47 | 39 | 59 | 151 | 191 | 195 | 159 |
|---|---|---|---|---|---|---|---|
| 43 | 15 | 11 | 31 | 79 | 135 | 147 | 91 |
| 35 | 7 | 3 | 23 | 71 | 119 | 127 | 83 |
| 55 | 27 | 19 | 51 | 103 | 163 | 171 | 115 |
| 107 | 67 | 63 | 99 | 183 | 211 | 219 | 199 |
| 179 | 123 | 111 | 167 | 215 | 243 | 247 | 227 |
| 187 | 139 | 131 | 175 | 223 | 251 | 254 | 235 |
| 155 | 95 | 87 | 143 | 203 | 231 | 239 | 207 |

FIG. 6

| 123 | 91  | 83  | 115 | 135 | 167 | 175 | 143 |
|-----|-----|-----|-----|-----|-----|-----|-----|
| 75  | 27  | 23  | 63  | 179 | 227 | 239 | 199 |
| 67  | 11  | 3   | 55  | 187 | 247 | 254 | 207 |
| 107 | 47  | 39  | 103 | 147 | 211 | 219 | 159 |
| 131 | 163 | 171 | 139 | 127 | 95  | 87  | 119 |
| 183 | 231 | 235 | 195 | 79  | 31  | 19  | 59  |
| 191 | 243 | 251 | 203 | 71  | 15  | 7   | 51  |
| 151 | 215 | 223 | 155 | 111 | 43  | 35  | 99  |

FIG. 7

| 119 | 87  | 79  | 111 | 135 | 167 | 175 | 143 |
|-----|-----|-----|-----|-----|-----|-----|-----|
| 71  | 27  | 19  | 59  | 179 | 227 | 239 | 199 |
| 63  | 11  | 3   | 47  | 187 | 247 | 254 | 207 |
| 103 | 39  | 31  | 95  | 147 | 211 | 219 | 159 |
| 127 | 163 | 171 | 139 | 131 | 99  | 91  | 123 |
| 183 | 231 | 235 | 195 | 83  | 35  | 23  | 67  |
| 191 | 243 | 251 | 203 | 75  | 15  | 7   | 55  |
| 151 | 215 | 223 | 155 | 115 | 51  | 43  | 107 |

FIG. 12

|   |   |   |   | 151 | 191 | 195 | 159 |
|---|---|---|---|-----|-----|-----|-----|
|   |   |   |   |     |     |     |     |
|   |   |   |   |     |     |     |     |
|   |   |   |   |     | 163 | 171 |     |
|   |   |   |   | 183 | 211 | 219 | 199 |
|   |   |   | 167 | 215 | 243 | 247 | 227 |
| 187 |   |   | 175 | 223 | 251 | 254 | 235 |
| 155 |   |   |   | 203 | 231 | 239 | 207 |

FIG. 13

|   |   |   |   | 151 | 191 | 195 | 159 |
|---|---|---|---|-----|-----|-----|-----|
|   |   |   |   |     |     |     |     |
|   |   |   |   |     |     |     |     |
|   |   |   |   |     | 163 | 171 |     |
|   |   |   |   | 183 | 211 | 219 | 199 |
|   |   |   | 167 | 215 | 223 | 235 | 227 |
| 187 |   |   | 175 | 243 | 251 | 254 | 247 |
| 155 |   |   |   | 203 | 231 | 239 | 207 |

ADDITIONAL INFORMATION = [$q_{0.0}$ $q_{0.1}\cdots q_{1.0}$ $q_{1.1}\cdots q_{2.0}$ $q_{2.1}\cdots q_{3.0}$ $q_{3.1}\cdots q_{3.3}$]

| 254 | 235 | 187 | 139 | 131 | 175 | 223 | 251 |
|---|---|---|---|---|---|---|---|
| 239 | 207 | 155 | 95 | 87 | 143 | 203 | 231 |
| 195 | 159 | 75 | 47 | 39 | 59 | 151 | 191 |
| 147 | 91 | 43 | 15 | 11 | 31 | 79 | 135 |
| 127 | 83 | 35 | 7 | 3 | 23 | 71 | 119 |
| 171 | 115 | 55 | 27 | 19 | 51 | 103 | 163 |
| 219 | 199 | 107 | 67 | 63 | 99 | 183 | 211 |
| 247 | 227 | 179 | 123 | 111 | 167 | 215 | 243 |

FIG. 22

| 75 | 47 | 39 | 59 | 151 | 191 | 195 | 159 |
|---|---|---|---|---|---|---|---|
| 43 | 15 | 11 | 31 | 79 | 135 | 147 | 91 |
| 35 | 7 | 3 | 23 | 71 | 119 | 127 | 83 |
| 55 | 27 | 19 | 51 | 103 | 163 | 171 | 115 |
| 107 | 67 | 63 | 99 | 183 | 211 | 219 | 199 |
| 179 | 123 | 111 | 167 | 215 | 243 | 247 | 227 |
| 187 | 139 | 131 | 175 | 223 | 251 | 254 | 235 |
| 155 | 95 | 87 | 143 | 203 | 231 | 239 | 207 |

ADDITIONAL INFORMATION = [q0.0 q0.1⋯q1.0 q1.1⋯q2.0 q2.1⋯q3.0 q3.1⋯q3.3]

: q$_{x,y}$ = 0 or 1

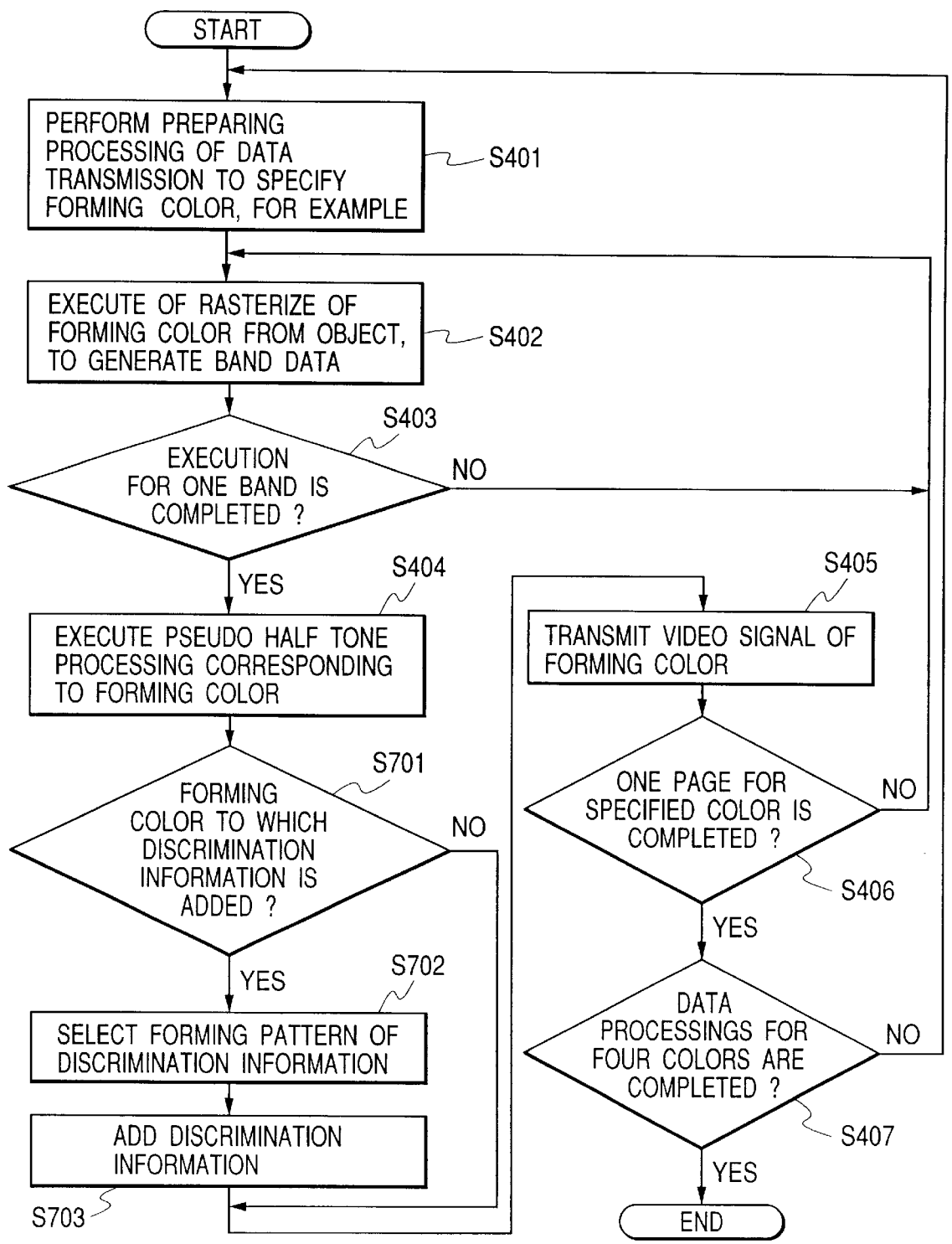

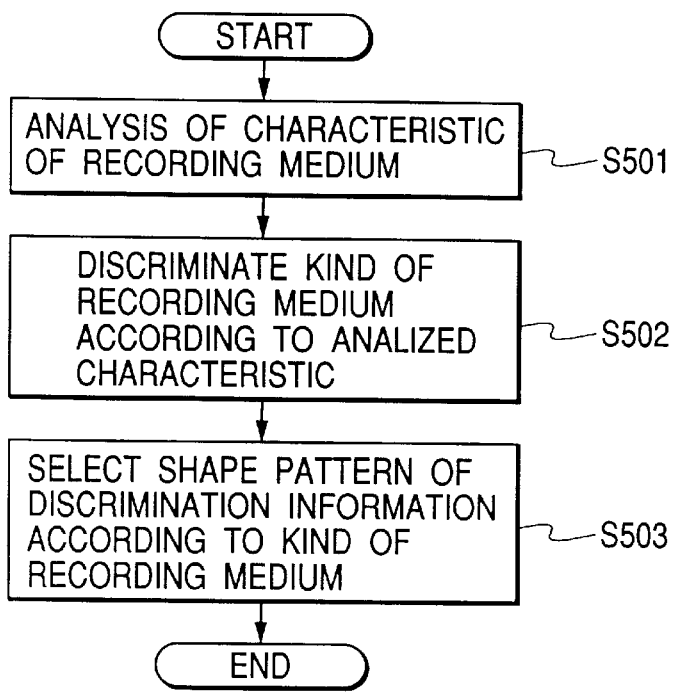

IMAGE PROCESSING APPARATUS AND METHOD THEREOF AND STORING MEDIUM

BACKGROUND OF THE INVENTION

1. Field of the Invention

The present invention relates to an image processing apparatus for, and method of, adding predetermined information to an input image and a storing medium which stores a program for implementing the method.

2. Related Background Art

Conventionally, as an output apparatus for performing a color print, a full-color printer, a full-color copying machine, a full-color facsimile apparatus or the like is practically used.

The output apparatus such as a color copying machine, a color printer or the like becomes cheaper every year and becomes more widely used.

On the other hand, quality of a printed image of the output apparatus has been improved. Therefore, it becomes possible to form an image having quality which is the same as that of an image of valuable securities or the like, whose image is generally prohibited from being reproduced. Consequently, there occurs concern that the image prohibited from being reproduced is illegally reproduced.

In order to inhibit such illegal image formation, conventionally, such a technique as putting predetermined additional information difficult to be perceived by human eyes on all images to be formed has been known. For example, in a case where a color image composed of yellow, magenta, cyan and black components is printed, a printing is to be performed by adding a dot pattern indicating the additional information to the yellow component. Consequently, the additional information can be extracted upon analyzing the yellow component and the dot pattern of a color image finally printed.

As the additional information, it is preferable to apply information which can easily grasp the image printed condition, for example, such information as a manufacturing number of copying machine, a manufacturer name or the like.

By the way, in a technique for adding additional information to an output image in order to detect a forgery action, even if the additional information is added by using a color which is the most difficult to be perceived, an extra signal should be added on an image signal. Accordingly, since the added signal acts as noise to an original image signal, there occurs such a problem as deteriorating quality of the output image. Especially, in a device which forms an image by performing binary image formation for each color such as an ink jet printer, that is, in a device for outputting an image on the basis of an image signal which is pseudo halftone processed depending on a dither method, an error diffusion method or the like, deterioration of image quality is generally found.

In a case where the additional information is added, the quality of the output image or detectability of the additional information is deteriorated in response to a characteristic of a recording medium. Therefore, in a case where the recording medium in a low level of a fixing characteristic of a toner is used, it is preferable to add the additional information under the condition of a high density or a large pattern size as long as possible in order to maintain the detectability of the additional information. In a case where the recording medium in a high transmittance is used, it is preferable to add the additional information under the condition of a low density or a small pattern size as long as possible in order to prevent the deterioration of image quality. That is, it is desirable to maintain a suitable balance between the quality of the output image and the detectability of the additional information in response to the characteristic of the recording medium.

SUMMARY OF THE INVENTION

However, in a conventional technique for adding additional information, a specific image processing means, which is different from a general image processing for adding the additional information, has to be provided. As a result, there has been a possibility of requiring a large cost for an apparatus and performing an image processing which is not adapted to another image processing such as a dither processing or the like.

The present invention is applied in consideration of the above-mentioned conventional example, and an object is to effectively add the additional information to an input image by utilizing the general image processing without executing the specific image processing.

More particularly, an object is to effectively add the additional information to the input image by utilizing N-value generation means for N-value generating a multi-value image.

To attain the above-mentioned object, according to a preferred embodiment of the present invention, an image processing apparatus of the present invention comprises input means for inputting M-value image data and N-value generation means for converting the M-value image data inputted by said input means into N-value image data, wherein the value M is larger than the value N, on the basis of threshold table groups composed of plural kinds of threshold tables whose using order is determined so as to indicate predetermined additional information.

The present invention maintains to attain the above-mentioned object, and still another object is to add the additional information depending on the most suitable forming pattern in accordance with the kind or characteristic of a recording medium.

To attain the above-mentioned object, according to a preferable embodiment of the present invention, the image processing apparatus of the present invention further comprises detection means for detecting the kind of recording medium on which an image indicated by the M-value image data inputted by said input means is to be formed, wherein the N-value generation means controls whether or not the N-value generation is performed to the M-value image data on the basis of the threshold table groups in accordance with the kind of the recording medium.

Other objects and features of the present invention will become apparent from the following embodiments and the attached drawings.

BRIEF DESCRIPTION OF THE DRAWINGS

FIG. 1 indicates an example of a threshold table used in a first embodiment;

FIG. 2 indicates an example of a threshold table used in the first embodiment;

FIG. 6 indicates an example of a threshold table used in a second embodiment;

FIG. 7 indicates an example of a threshold table used in the second embodiment;

FIG. 12 indicates an example of a threshold table used in a third embodiment;

FIG. 13 indicates an example of a threshold table used in the third embodiment;

FIG. 21 indicates an example of thresholds corresponding to each pixel in 8×8 pixels;

FIG. 22 indicates an example of a threshold table in which the additional information is maintained;

FIG. 27 is a flow chart showing an example of a procedure of generating a video signal and transmitting it depending on the printer controller in a fifth embodiment;

FIG. 28 is a flow chart showing an example of a procedure for selecting the additional information in accordance with a characteristic of a recording medium;

FIG. 29 indicates an example of a table in which data giving the characteristic of the recording medium is registered;

DETAILED DESCRIPTION OF THE PREFERRED EMBODIMENTS

As to a pseudo halftone processing described in each embodiment, the present invention includes at least two cases. One case (case shown in FIG. 14A) is that an image processing unit in an unity copying machine (particularly, a copying machine 1400 of an electrophotographic system), which has a scanner and a printer in a body of equipment, performs the pseudo halftone processing. The other case (case shown in FIG. 14B) is that an image processing unit in a printer (particularly, an LBP 1401 of the electrophotographic system), which performs a print from a printer unit after developing color image data described by a predetermined description system inputted from an external host computer 1402, performs the pseudo halftone processing. The above-mentioned printer can be applied to an ink jet printer, a heat sensitive (thermal) printer or the like.

Figure 14A:
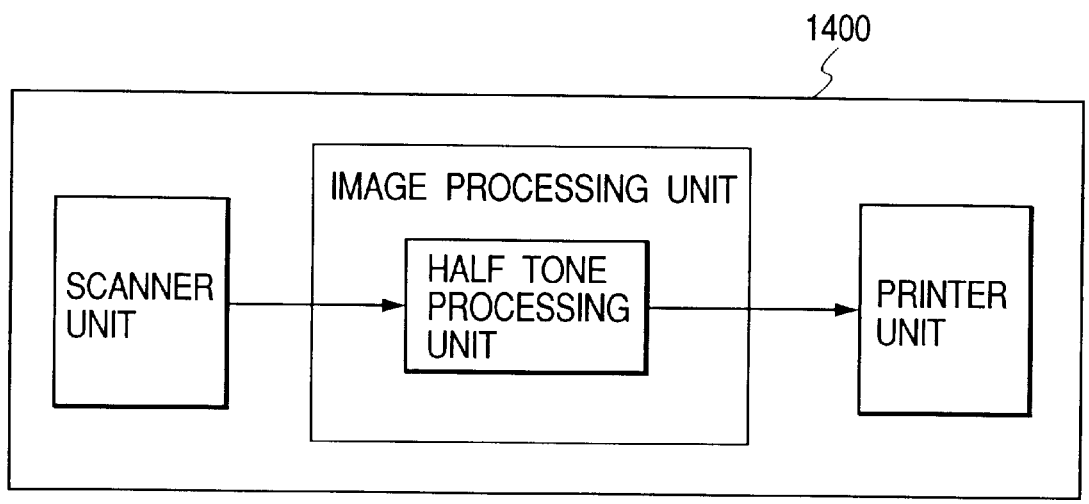
FIGS. 14A and 14B indicate an example of a system construction having an image processing unit.

More particularly, in the case shown in FIG. 14A, an original is read by the scanner to generate multi-value image data to which an image processing (described later) is executed, thereafter, an image is printed out from the printer as a visible image. On the other hand, in the case shown in FIG. 14B, the image processing unit inputs code data of page description language which indicates a multi-value image from the host computer 1402 to develop the code data for generating multi-value image data to which an image processing (described later) is executed, thereafter, an image is printed out from the printer as a visible image.

In the image processing unit as in the above-mentioned structure, when predetermined additional information is added, in the former case, it is preferable to apply a manufacturing number of a main body of the copying machine, an ID of a user who purchases the copying machine or the like as the additional information. In the latter case, it is preferable to apply a network ID in an external host computer, a manufacturing number, a manufacturer name, an user ID of the host computer, an application name being had by the host computer, a version of the application, a manufacturing number of a main body of the printer, an user ID or the like as the additional information.

Accordingly, in a case where a printed image is illegally used, it becomes possible to know the state of forming the printed image by obtaining the additional information to analyze contents of the printed image.

The present invention includes the case for simultaneously adding the above plural items as the additional information.

In the following embodiment, it is described that binary image data is generated depending on the pseudo halftone processing (screening process). However, the present invention is not limited to this, but can be applied to a case for converting M-value image data into N-value image data, wherein the value M is larger than the value N.

Figure 14B:
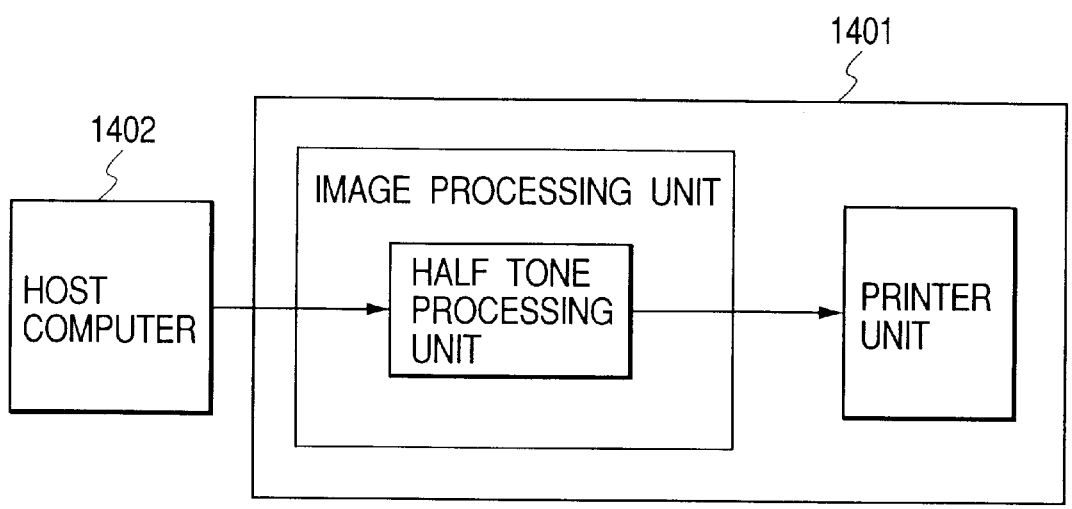

In the following, a system for adding the additional information under the condition that the image processing unit shown in FIGS. 14A and 14B executes the pseudo halftone processing for the inputted image data will be described in detail.

FIGS. 1 and 2 indicate threshold tables used in case of pseudo halftone processing the inputted multi-value image data (8 bits) as the binary image data.

In a first embodiment, the additional information is expressed according to a switching manner of the threshold table used in generating a pseudo halftone image. That is, the threshold tables shown in FIGS. 1 and 2 used in generating the pseudo halftone image (image after performing a dither processing) are switched so as to indicate certain additional information. As a result, the pseudo halftone image having different pixel growing patterns is formed. Consequently, if the switching manner of the threshold tables is analyzed, from the pseudo halftone image, the additional information put on this image can be extracted.

It is assumed that each of the threshold tables shown in FIGS. 1 and 2 has the size of 8×8 pixels and the dither processing is sequentially executed to the inputted image data.

In this embodiment, in a case where the threshold table shown in FIG. 1 is used, 0 is indicated. In a case where the threshold table shown in FIG. 2 is used, 1 is indicated. Accordingly, the additional information of one bit can be put on every area of 8×8 pixels in an image. In this embodiment, if the additional information to be added is data of 16 bits, an area corresponding to the threshold tables of 16 pieces is required. Therefore, for example, in a case where the additional information is added to an image having the size corresponding to 16×100 threshold tables, the same additional information is repeatedly added 100 times.

It should be noted that an expressing manner of the additional information is not limited to this manner, but may be expressed, without treating one bit information of 0 or 1 indicated by the threshold tables shown in FIGS. 1 and 2 as a part of the additional information as it is, by the manner of run-length using the combinations of 0 and 1.

In this embodiment, an area for putting the additional information on an image of one frame is not limited to an entire image, but an area other than an area to which the additional information is added at a fixed period (area for switching the threshold tables shown in FIGS. 1 and 2) may be assigned. In the following, a case for using this method will be described.

Figure 4:
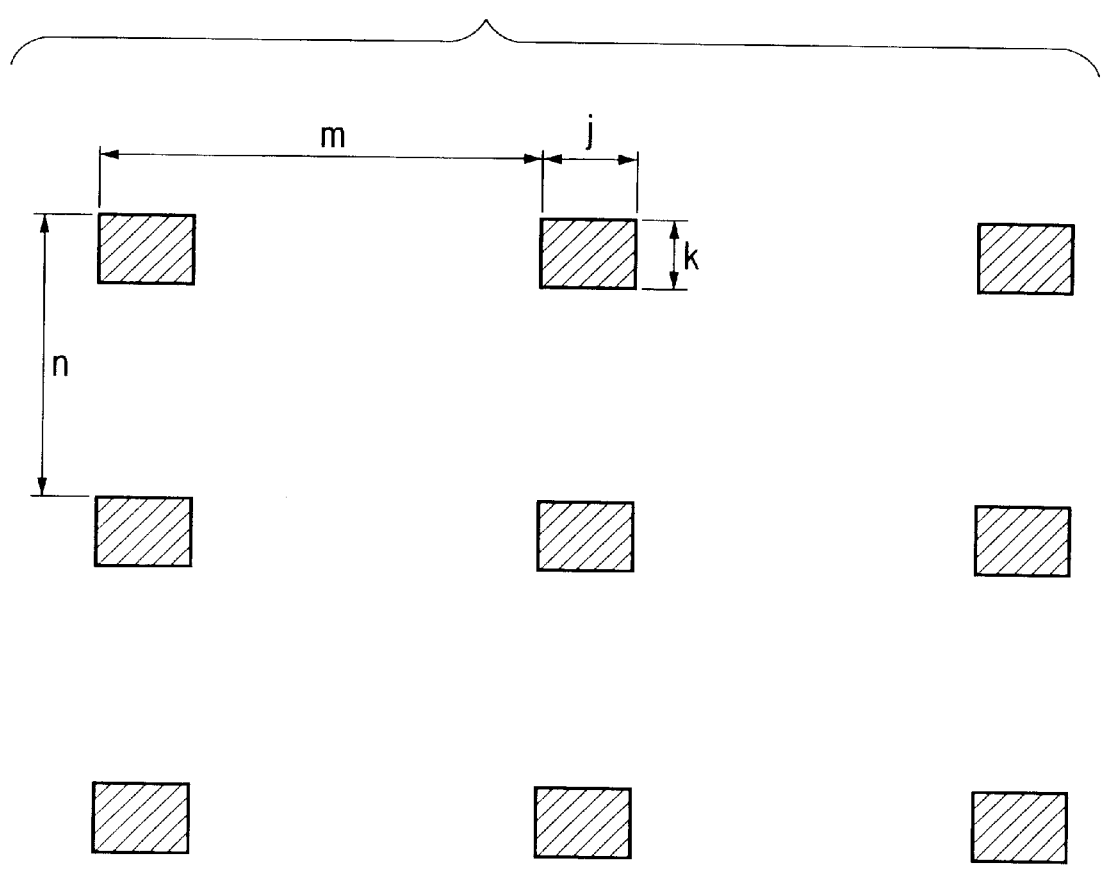
FIG. 4 indicates areas, to which additional information is added, in an input image.

FIG. 4 indicates the state of assigning manner of the above-mentioned additional area in this embodiment.

In FIG. 4, areas of oblique lines are additional areas. That is, the additional information (in this embodiment, 16 bits) has to be put on these areas by switching the threshold tables shown in FIGS. 1 and 2.

The additional area has the size of containing j×k threshold tables (in this embodiment, j=4 and k=4). That is, each of the additional areas can express the additional information of j×k bits.

As to the positional relation of each area among the additional areas, it is assumed that length m and length n in FIG. 4 have distance capable of containing the threshold tables of 16 pieces (8×16 pixels).

Figure 3:
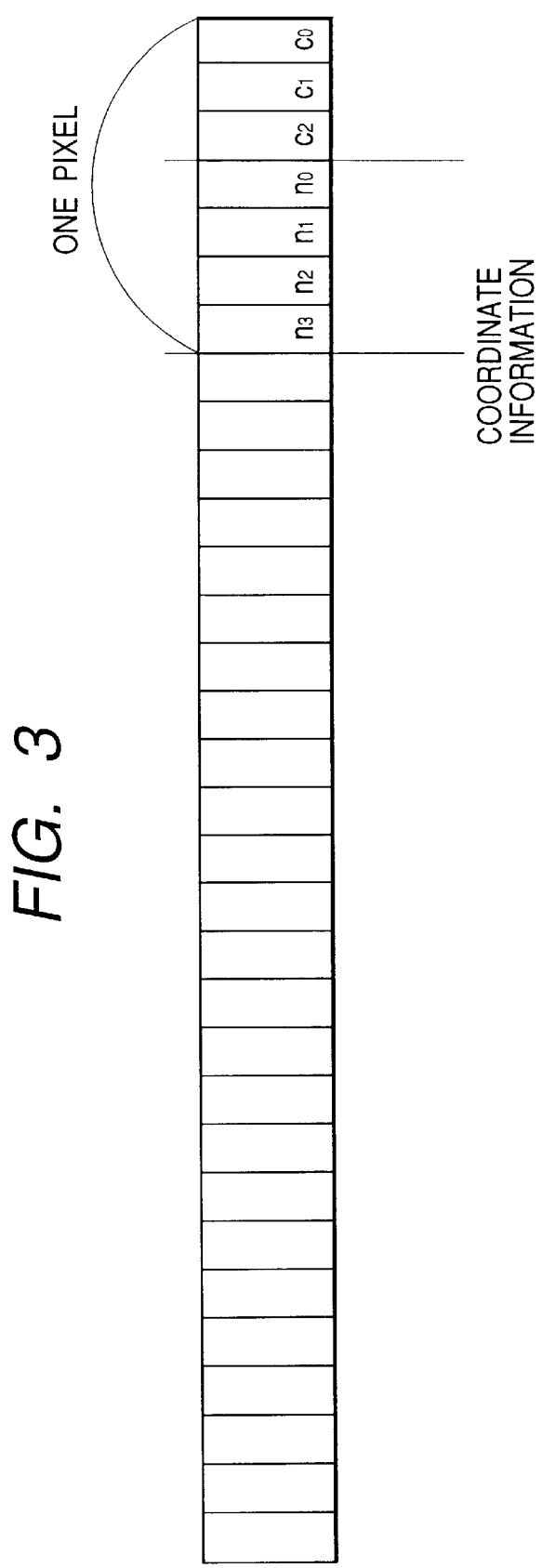
FIG. 3 indicates bit information of coordinate information in an image in the first embodiment.

FIG. 3 indicates the state of a bit column indicating a coordinate in each pixel of an image in the image processing unit. As mentioned above, by setting each parameter as a multiplier of 2, a coordinate value expressed in a binary number can be easily treated as shown in FIG. 3. In FIG. 3, three bits of the lowest order unit ($c_2$, $c_1$, $c_0$) is the coordinate indicating a position of each of the additional areas. When two bits of upper order ($n_3$, $n_2$) within four bits ($n_3$, $n_2$, $n_1$, $n_0$) adjoining the three bits of the lowest order unit corresponds to specific values (in this embodiment, $n_3$=1, $n_2$=1), since such a threshold table as indicating the additional information of 16 bits may have to be selected, it becomes possible to execute a high-speed processing.

In this embodiment, the threshold table shown in FIG. 1 is unconditionally used to an area other than areas of oblique lines (additional areas) shown in FIG. 4. In this manner, the areas of oblique lines can be easily read.

Figure 15:
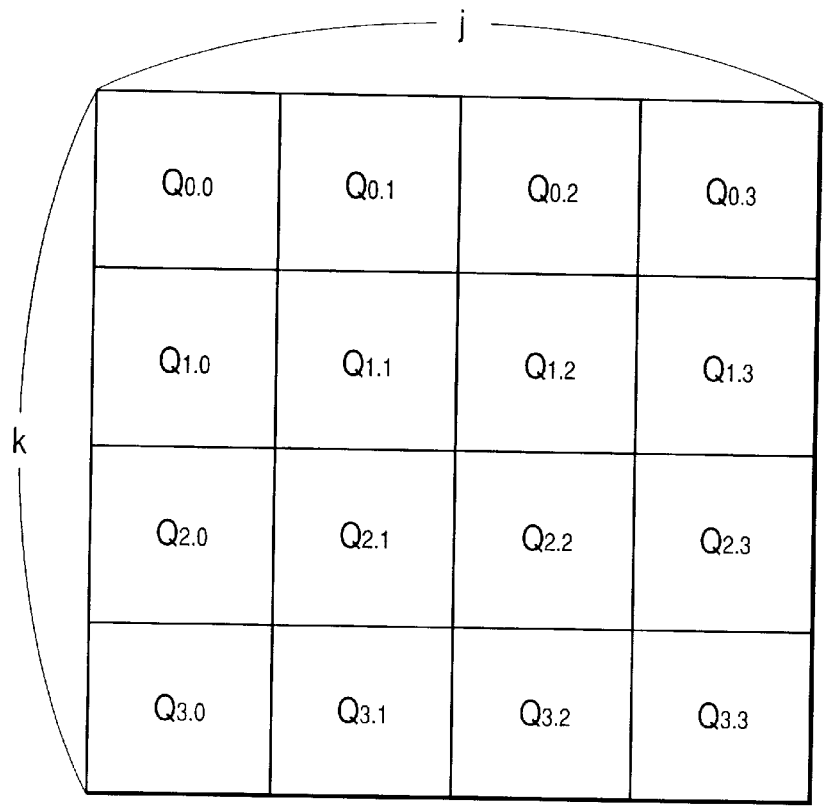
FIG. 15 indicates the state of assigning threshold tables within an additional area.

FIG. 15 indicates the state of threshold tables $Q_{0,0}$ to $Q_{3,3}$ in each of the additional areas and the state of expressing the additional information by aligning bit information $q_{0,0}$ to $q_{3,3}$ represented by each of the threshold tables.

As shown in FIG. 15, the threshold tables of 16 pieces $Q_{0,0}$ to $Q_{3,3}$ are assigned to each of the additional areas. The threshold table shown in FIGS. 1 or 2 is used for each of these tables $Q_{0,0}$ to $Q_{3,3}$. Therefore, the additional information of 16 bits is expressed by aligning the bit information $q_{0,0}$ to $q_{3,3}$ being the value of 0 or 1 represented by the threshold tables $Q_{0,0}$ to $Q_{3,3}$.

Figure 5:
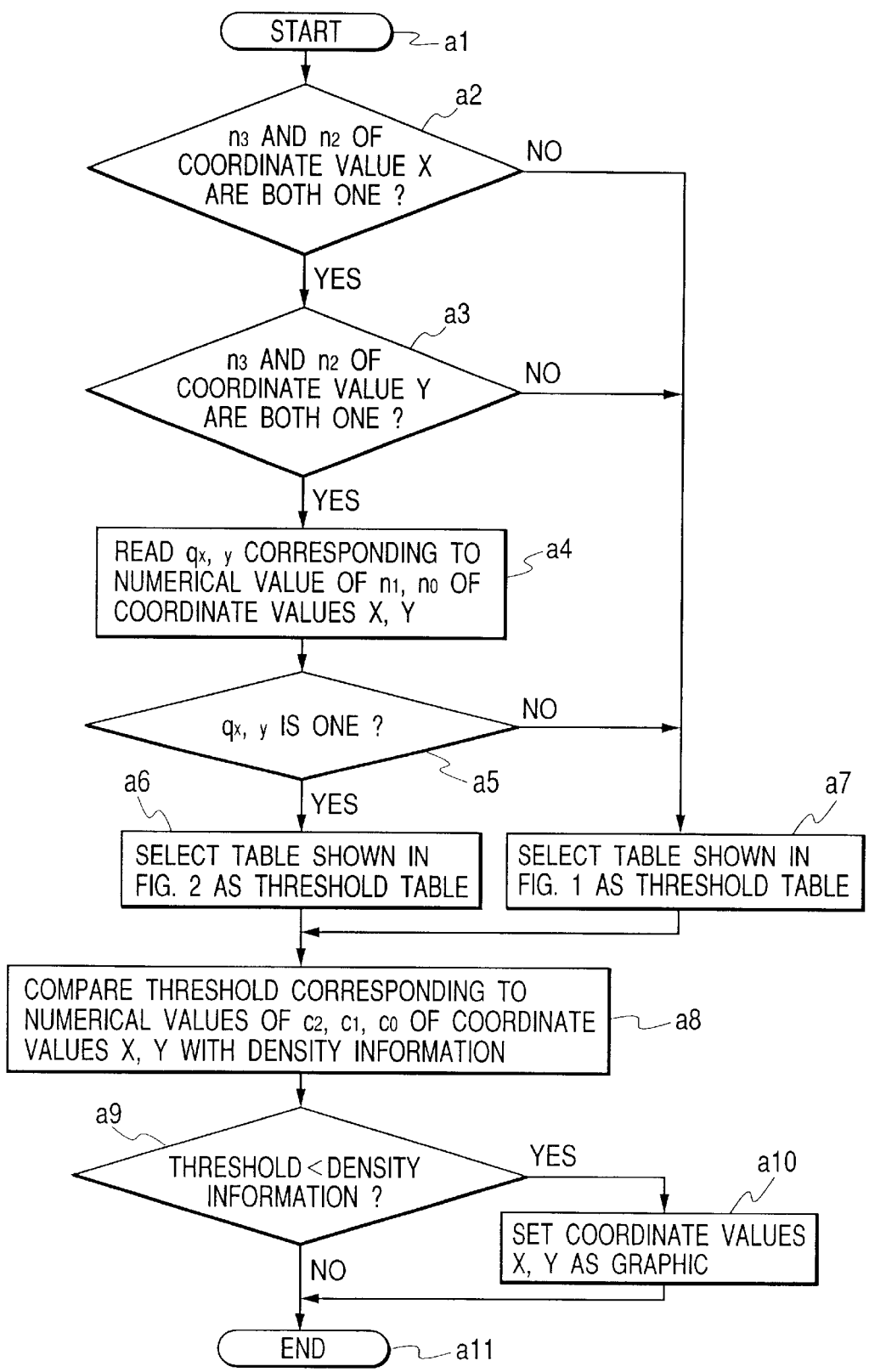
FIG. 5 indicates an operation procedure of a pseudo halftone processing in the first embodiment.

FIG. 5 indicates a procedure for pseudo halftone processing a pixel corresponded to coordinates X, Y.

In a step a2, as to a coordinate value X, it is judged whether or not each of $n_3$ and $n_2$ is 1. If each of $n_3$ and $n_2$ is not 1, the flow advances to a step a7. If both of $n_3$ and $n_2$ are 1, the flow advances to a step a3.

Next, in the step a3, as to a coordinate value Y, it is judged whether or not each of $n_3$ and $n_2$ is 1. If each of $n_3$ and $n_2$ is not 1, the flow advances to the step a7. If both of $n_3$ and $n_2$ are 1, the flow advances to a step a4.

In the step a4, either of bit information $q_{0,0}$ to $q_{3,3}$ corresponding to numerical values $n_1$ and $n_0$ of the coordinate values X and Y are read.

In a step a5, it is judged whether or not the bit information $q_{0,0}$ to $q_{3,3}$ which are read are 1. If the judged result does not obtain 1, the flow advances to the step a7. If the judged result obtains 1, the flow advances to a step a6.

In the step a6, it is set to perform the pseudo halftone processing by using the threshold table shown in FIG. 2, that is, the table of indicating 1. On the other hand, in the step a7, it is set to execute the pseudo halftone processing by using the threshold table shown in FIG. 1, that is, the table of indicating 0.

In a step a8, density information (pixel value) of the coordinate values X and Y is compared with the thresholds corresponding to the numerical values $c_2$, $c_1$ and $c_0$ which indicate this coordinate values.

In a step a9, in a case where the threshold is smaller than the density information as the result in the step a8, the flow advances to a step a10. If the threshold is not smaller than the density information, the pixel for graphic drawing the coordinate values X and Y is disregarded and the flow ends in a step a11.

In the step a10, the coordinate values X and Y are set as the pixel for performing a graphic drawing, thereafter, the flow ends in the step a11.

In this embodiment, although the additional information of one bit is to be put on within an area corresponding to one threshold table by switching two threshold tables, the present invention is not limited to this manner. For example, the present invention includes the case for putting the additional information of more than two bits on every area corresponding to one threshold table by use of switching four or more threshold tables.

In a second embodiment, an example of adding method for adding the additional information in case of having a plurality of dots, which grow with the screening condition, within one threshold table will be described. More particularly, the additional information is added by executing a process of switching the growing condition of a plurality of dots at a level difficult to be perceived visually for each growing dot within one threshold table.

In a pseudo halftone processing which grows with the screening condition, a method for adding the additional information in a case where two or more growing dots exist in one threshold table will be described hereinafter.

FIGS. 6 and 7 indicates examples of threshold tables which grow around two dots within one threshold table as increasing the density. The growing condition of density of two dots in the threshold table are little different from each other when the case in FIG. 6 is compared with the case in FIG. 7. If the threshold table in FIG. 7 is compared with that in FIG. 6, especially, such a threshold table in FIG. 7 as the density of an upper left growing point within a dither matrix grows preferentially is prepared.

In this embodiment, the additional information is added by switching the threshold tables in FIGS. 6 and 7 similar to the case in the first embodiment. In case of using the threshold table in FIG. 6, 0 is treated as a part (one bit) of the additional information (16 bits). In case of using the threshold table in FIG. 7, 1 is treated as a part (one bit) of the additional information (16 bits). The manner for adding the additional information by switching the threshold table is the same as that in the first embodiment.

In this embodiment, in an area of high density, it is difficult to switch the threshold table, that is, it is difficult to detect the additional information. Therefore, as in a description of the first embodiment, a part of an image is not treated as the additional area, but an entire image is treated as the additional area, thereby enabling to switch the threshold table in an area of low density. That is, the additional information can be detected.

However, if the entire image is treated as the additional area, an initial switching of the threshold table can not be performed. That is, an initial position of the additional information can not be determined. Therefore, in this embodiment, not only the additional information but information (image) for indicating a reference position used to notice the systematic positional relation is added. As a result, it becomes possible to analyze and extract the additional information without mistaking the initial position of the additional information.

Figure 8:
FIG. 8 indicates areas, to which additional information is added, in an input image.

FIG. 8 indicates an assigning manner of blank areas used for adding information which indicates the reference position.

As shown in FIG. 8, areas in which the additional information is added (additional areas) and the blank areas being the reference positions for the additional areas are arranged to be adjoined to each other in their upper and lower sides.

The threshold table in FIG. 6 is unconditionally used for the blank area.

A size of the additional area is expressed as j×k. In this embodiment, as in the first embodiment, each length of j and k has distance capable of containing four threshold tables corresponding to the length of 32 pixels. Consequently, in this embodiment, since the threshold tables of 4×4 pieces can be contained in each of the additional areas, the additional information of 16 bits can be added. It should be noted that a size of the blank area is also expressed as is j×k as apparent from FIG. 8.

Figure 9:
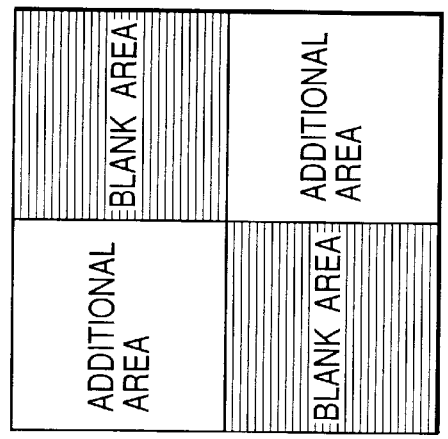
FIG. 9 indicates the state of a plurality of thresholds used by combining with each other.

In this embodiment, the combination of the threshold tables of 8×8 pieces, which are structured by the blank areas and the additional areas combined with each other as shown in FIG. 9, is previously prepared. Consequently, an image processing corresponding to the coordinate values X and Y can be executed at a high speed. The coordinate position can be easily discriminated by setting each parameter as a multiplier of 2.

Figure 11:
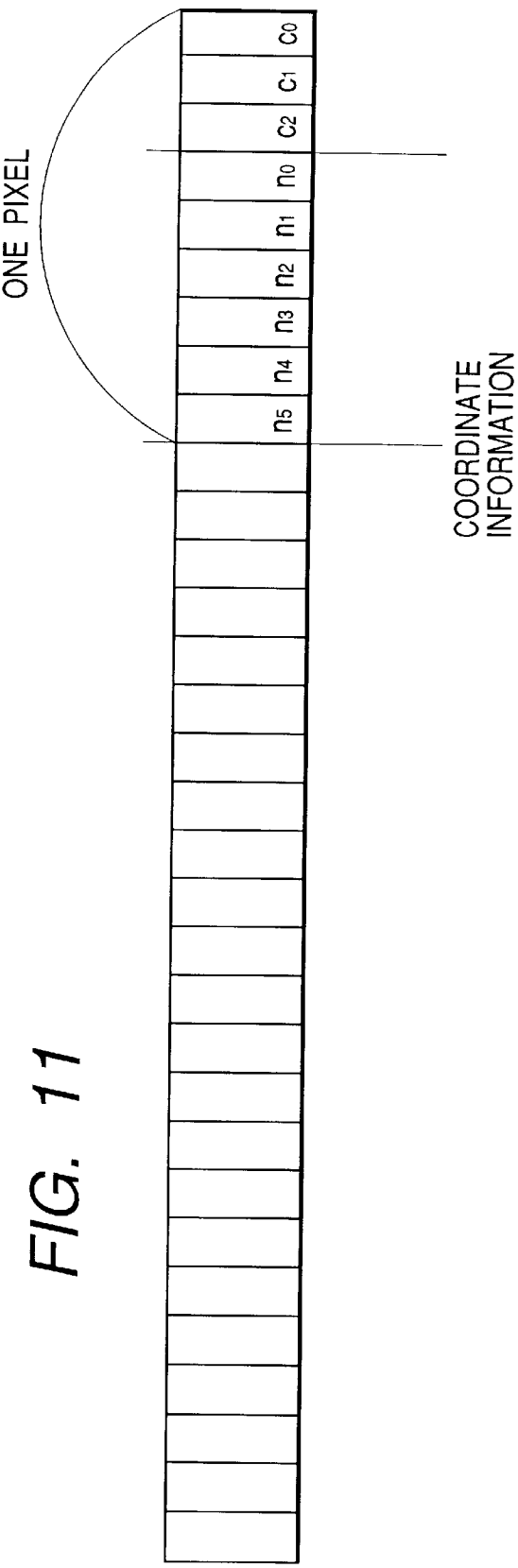
FIG. 11 indicates bit information of coordinate information in an image in the second embodiment.

FIG. 11 indicates the state of a bit column indicating a coordinate in each pixel of an image in the image processing unit, wherein a bit of the lowest order is represented by $c_0$ and a bit of the most upper order is represented by $n_5$.

In FIG. 11, three bits of the lowest order unit ($c_2$, $c_1$ and $c_0$) indicates a position of each of the additional areas, and such a threshold table as indicating the additional information of 16 bits on the basis of information of four bits within six bits ($n_5$, $n_4$, $n_3$, $n_2$, $n_1$ and $n_0$) adjoining the three bits of the lowest order unit may have to be selected.

FIG. 15 indicates the state of the threshold tables $Q_{0,0}$ to $Q_{3,3}$ of 16 pieces in each of the additional areas and the state of expressing the additional information of 16 bits by aligning each of bit information $q_{0,0}$ to $q_{3,3}$ represented by each of the threshold tables.

As shown in FIG. 15, the threshold tables $Q_{0,0}$ to $Q_{3,3}$ are assigned to each of the additional areas. The threshold table shown in FIG. 6 or 7 is used for each of these tables $Q_{0,0}$ to $Q_{3,3}$. Therefore, the additional information of 16 bits is expressed by aligning the bit information $q_{0,0}$ to $q_{3,3}$ being the value of 0 or 1 represented by the threshold tables $Q_{0,0}$ to $Q_{3,3}$.

Figure 10:
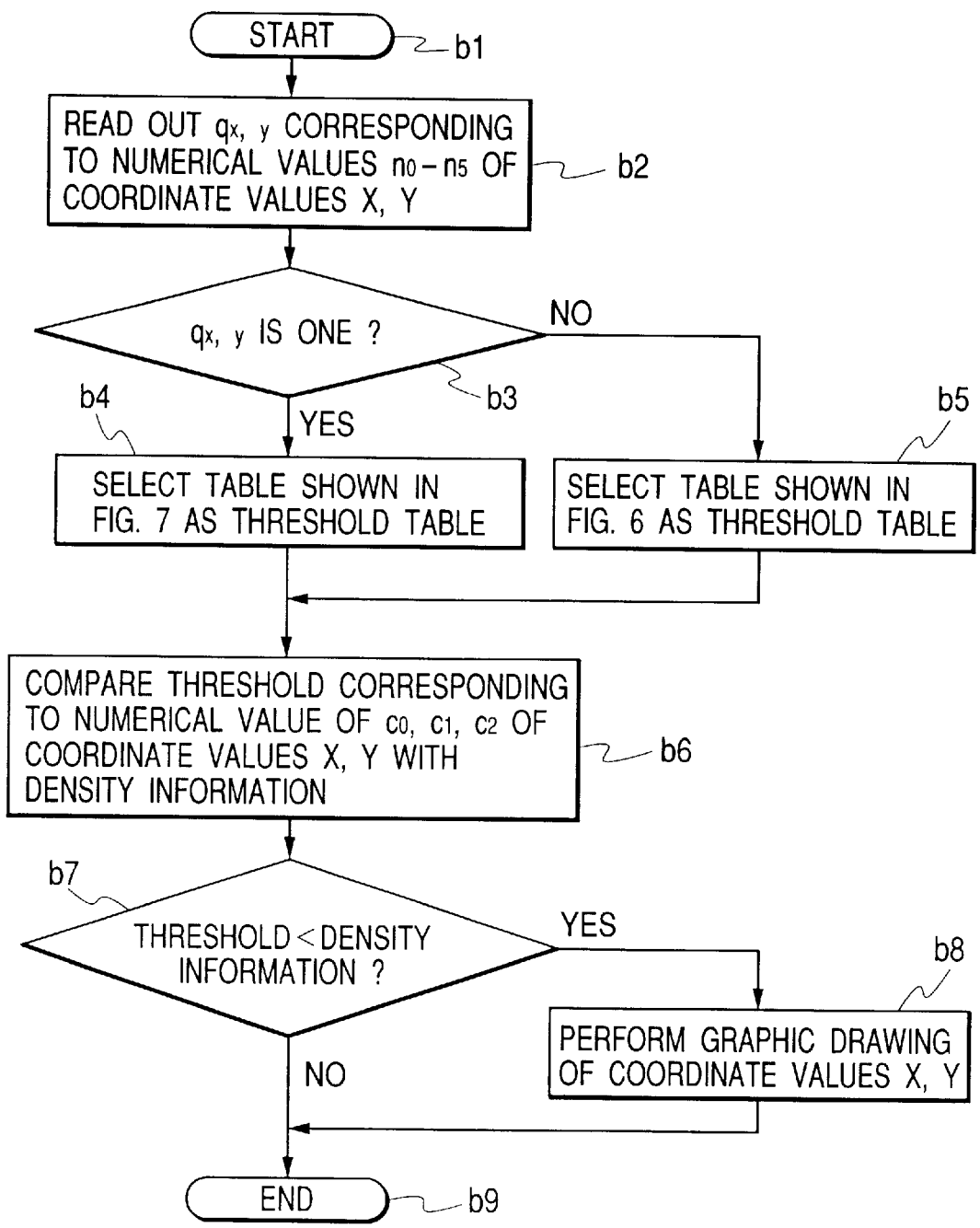
FIG. 10 indicates an operation procedure of a pseudo halftone processing in the second embodiment.

FIG. 10 indicates a procedure for pseudo halftone processing a pixel corresponding to coordinates X, Y.

In a step b2 in FIG. 10, at first, either the bit information $q_{x,y}=q_{0,0}$ to $q_{3,3}$ (in case of additional area) or the bit information $q_{x,y}=0$ (in case of blank area) corresponding to the combination of numerical values $n_0$ to $n_5$ is read.

Next, in a step b3, it is judged whether or not the bit information $q_{x,y}$ is1. As the result of judgement, if the bit information $q_{x,y}$ is not 1, it is set to use the threshold table in FIG. 6 for the pixel of the coordinates X, Y (step b5). If the bit information $q_{x,y}$ is 1, it is set to use the threshold table in FIG. 7 for the pixel of the coordinates X, Y (step b4).

In a step b6, the threshold corresponding to numerical values $c_2$, $c_1$ and $c_0$ is read from the threshold tables in the steps b4 and b5 to compare it with a density value of the pixel of the coordinate values X and Y.

In a step b7, if the threshold is smaller than density information, the flow advances to a step b8 to set to perform a graphic drawing of the coordinate values X and Y.

On the other hand, if the threshold is not smaller than the density information, it is set not to perform the graphic drawing of the coordinate values X and Y to terminate the process.

As in the first embodiment, this embodiment enables to put a plurality of bit information on every little area by switching threshold tables more than two pieces.

In a process for switching the threshold tables used in the second embodiment, a plurality of threshold tables have been prepared subject to a plenty of areas whose density is comparatively at a low level. Therefore, in a plurality of threshold tables used in the second embodiment, it becomes impossible to discriminate the difference among the threshold tables if the density of an entire image becomes a high level. A third embodiment solves this problem.

In the third embodiment, information of 0 or 1 is put on by use of switching threshold tables shown in FIGS. 12 and 13 instead of the threshold tables shown in FIGS. 6 and 7 in the second embodiment. Since the other processes are the same as those in the second embodiment, the description will be omitted. It should be noted that areas of oblique lines are such areas as both threshold tables have the same threshold.

In this embodiment, in a case where the density becomes high level (e.g., in a case where all pixels within the threshold table have the density value of 240), in the threshold table in FIG. 12, a thick linear square frame remains as a white area. On the other hand, in the threshold table in FIG. 13, a thick linear rectangle frame remains as a white area. Accordingly, in this embodiment, in a case where a number of areas of which density is comparatively in a high level exist, since the shape of white pixels remaining in a matrix can be recognized, the switching method of the threshold tables can be easily analyzed.

Without limiting to the second and third embodiments, the present invention, in consideration of the second and third embodiments, includes a case for selectively using plural prepared threshold tables which can discriminate the switching method of the threshold tables (additional information) even if an image is in a high density area or a low density.

According to the above embodiments, in case of outputting an inputted multi-value image to a printer or the like after executing the pseudo halftone processing such as the dither processing or the like, since a predetermined additional information has to be added by switching a processing method of this pseudo halftone processing generally executed, it becomes possible to add the additional information, while preventing the deterioration of an image as long as it is possible. Especially, it is not required to add the dot pattern for expressing the additional information in another image processing unit after forming the pseudo halftone image, it becomes possible to suppress the increasing of the cost of an apparatus and the deterioration of the image caused by modulating an image after executing the pseudo halftone processing can be prevented.

In the above embodiments, a case for executing the pseudo halftone processing by inputting only the multi-value image is described. However, without limiting to Jthis, the present invention includes a case for performing the above-mentioned processing to a multi-value image of each color component by inputting a multi-value color image composed of a plurality of color components.

For example, in case of executing the pseudo halftone processing by inputting multi-value color image data composed of data of eight bits of each color component yellow, magenta, cyan and black, a single pseudo halftone processing is executed to data of eight bits of each color component yellow, magenta, cyan and black (e.g., the pseudo halftone processing is executed by using the threshold table in FIG. 1 for all color components). Thereafter, if the adding of the additional information depending on the above-mentioned switching of the threshold tables is performed to only a multi-value image expressed by data of eight bits of yellow component, a color image having excellent quality can be formed and the additional information can be added.

The reason for adding the additional information to only the yellow component is that the yellow component, within the above four color components, is a color most difficult to be perceived by the human eye.

If the above-mentioned process is independently executed to each of yellow, magenta, cyan and black components, four kinds of additional information can be added. This process is not limited to the above color components, but may be applied to a multi-value color image composed of R, G and B components or the like.

As described above, according to the present invention, since the additional information is expressed by use of switching a plurality of threshold tables, it becomes possible to add the additional information effectively to an input image utilizing a general image processing. Therefore, the deterioration of an image after executing the general image processing can be greatly prevented by adding the additional information (changing of image data) in a final step.

Since the additional information is added by utilizing the general image processing, an image processing is entirely executed at a high speed comparatively.

In a case where an image added the additional information is formed on a recording medium, the condition of forming this image (manufacturing number of an apparatus or the like) can be analyzed.

In a fourth embodiment, an example of applying the present invention to a laser beam printer (LBP) will be described. The present invention is not limited to the LBP but may be applied to, for example, another type of outputting apparatus such as an ink jet printer, a thermal printer or the like.

Figure 16:
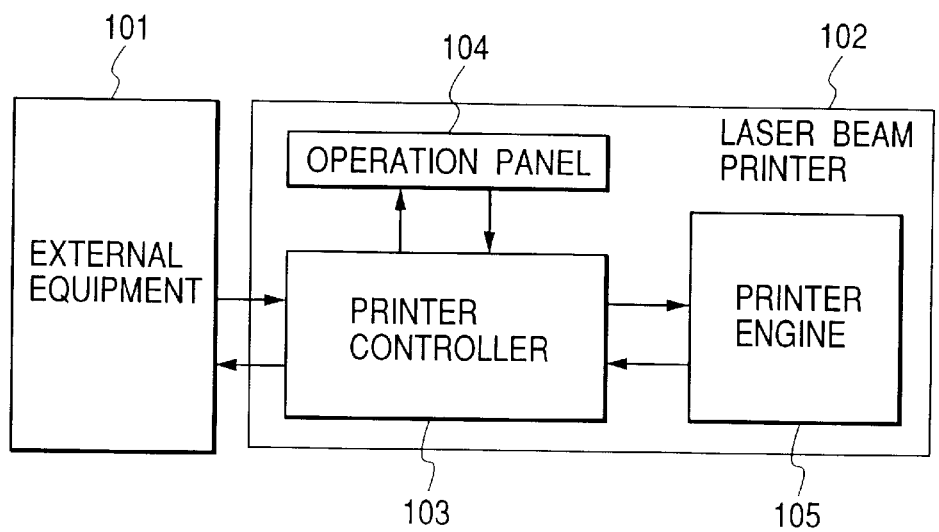
FIG. 16 is a block diagram showing the structure of an LBP (laser beam printer)

FIG. 16 is a block diagram showing the structure of the LBP used in the following embodiment.

In FIG. 16, print data which contains color multi-value information described by a predetermined page description language (PDL) is inputted to a LBP 102 which can output a color image from an external device 101 such as a host computer or the like. A printer controller 103 generates image data by analyzing the inputted print data. A printer engine 105 prints an image, which is indicated by the image data generated by the printer controller 103, on a recording paper. Keys and switches for instructing a desired operation to the LBP 102 from an user and indicators such as a liquid crystal display (LCD), light emitting diodes (LED) and the like for displaying the operation condition and the operation state of the LBP 102 are arranged on an operation panel 104 which is an interface with the user.

Figure 17:
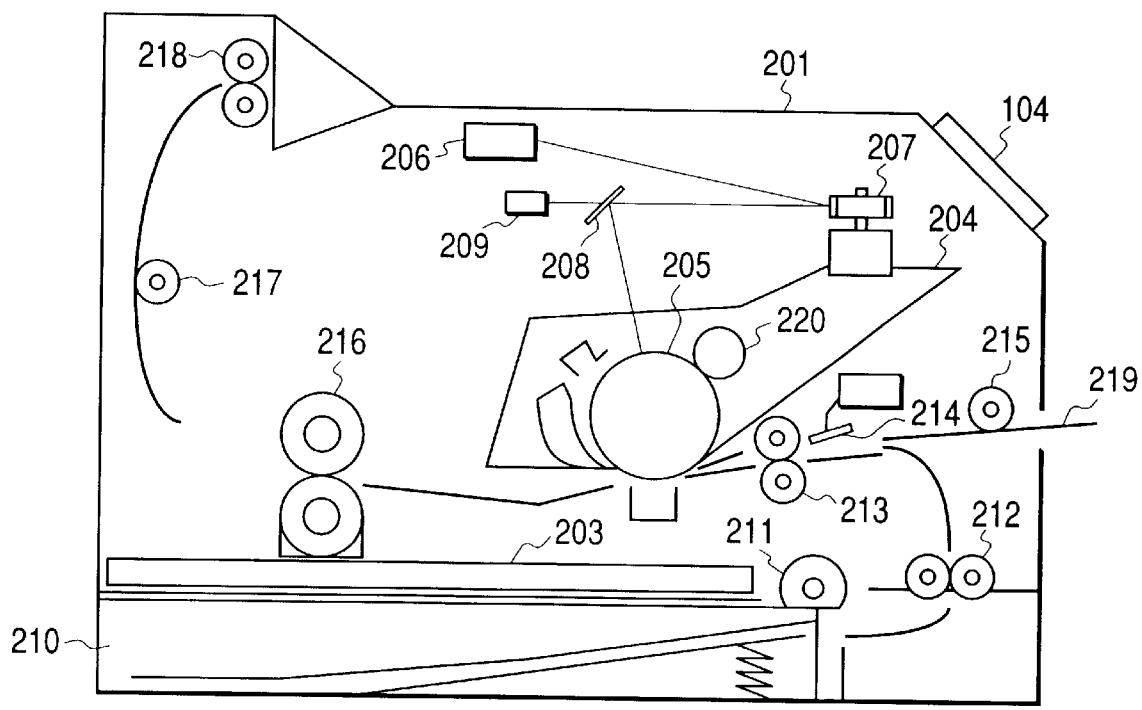
FIG. 17 is a conceptional view showing a structural example of the LBP.

FIG. 17 is a conceptional view showing a structural example of the LBP 102.

In FIG. 17, each mechanism for structuring the printer engine 105, an engine control unit (not shown) for performing a control concerning a printing process depending on each mechanism and a holding unit 203 for holding a control board in which the printer controller 103 is structured are included in a body of equipment 201 of the LBP 102.

As each mechanism for structuring the printer engine 105, an optical processing mechanism which forms a latent image on a photosensitive drum 205 by scanning a laser beam, visualizes the latent image and transfers the visualized image on the recording paper, a fixing processing mechanism which fixes a toner image transferred on the recording paper, a feed processing mechanism of the recording paper and a carrying processing mechanism of the recording paper are provided.

A laser driver 206 of the optical processing mechanism performs an on/off driving of an output beam from a semiconductor laser element (not shown) on the basis of image data supplied from the printer controller 103. The laser beam outputted from the semiconductor laser element is scanned in the direction of an axis of the photosensitive drum 205 (main scanning direction) by a rotational multi-mirrors 207. The laser beam reflected by the rotational multi-mirrors is guided to the photosensitive drum 205 through a reflection mirror 208 to expose a surface of the photosensitive drum 205. The latent image, which is formed on the photosensitive drum 205 by an exposure scanning of the laser beam, is visualized as a toner image by toners supplied from a development unit 220. The development unit 220 supplies toners of each color component Y (yellow), M (magenta), C (cyan) and K (black). The toner image on the photosensitive drum 205 is transferred to the recording paper which is carried in the direction of sub scanning synchronized with a formation of an image of each color component by the feed processing mechanism of the recording paper.

A detachable cartridge 204 holds the photosensitive drum 205 and the development unit 220. The reflection mirror 208 is composed of a semi-transmittance type mirror whose back side has a beam detector 209 arranged on it. The beam detector 209 detects the laser beam to supply the detected signal to the printer controller 103. The printer controller 103 generates a horizontal synchronization signal for determining an exposure timing on the basis of the detected signal in the beam detector 209. The horizontal synchronization signal is supplied to each part of the printer engine 105 as a synchronization signal.

A fixing unit 216 in the fixing processing mechanism heats and pressures the toner image transferred on the recording paper to fix it on the recording paper. A heater for heating the toner image is controlled by an engine control unit so as to obtain the predetermined fixing temperature.

The feed processing mechanism of the recording paper has a cassette 210 for holding recording papers and a manual feeding tray 219 and is structured to selectively feed the recording paper in the cassette 210 or the manual feeding tray 219. In the cassette 210 equipped in the body of equipment 201, a recording paper size detection mechanism for detecting the size of recording papers in accordance with a moving position of a partition plate (not shown) is provided. The recording papers held in the cassette 210 are carried one by one to a paper feed roller 212 in response to the rotational driving of a cassette feed clutch 211. The cassette feed clutch 211 is composed of a cam which is intermittently rotated every feeding of the recording paper by a driving unit (not shown). One recording paper is fed to the paper feed roller 212 every rotation of the cam.

The paper feed roller 212 carries the recording paper until such a position as a leading edge of the recording paper reaches to a resist shutter 214. The resist shutter 214 is used for coinciding a leading edge of the toner image formed on the photosensitive drum 205 with a vicinity of the leading edge of the recording paper which is to be fed. On the other hand, recording papers in the manual feeding tray 219 are supplied to the resist shutter 214 by a paper feed roller 215.

The carrying processing mechanism of the recording paper has a carrying roller 213 for carrying recording papers released from the resist shutter 214 to the photosensitive drum 205, carrying rollers 217 and 218 for guiding the recording papers discharged from the fixing unit 216 to a discharging tray provided on an upper portion of the body of equipment 201 and a driving unit (not shown) for driving the carrying rollers 213, 217 and 218.

Figure 18:
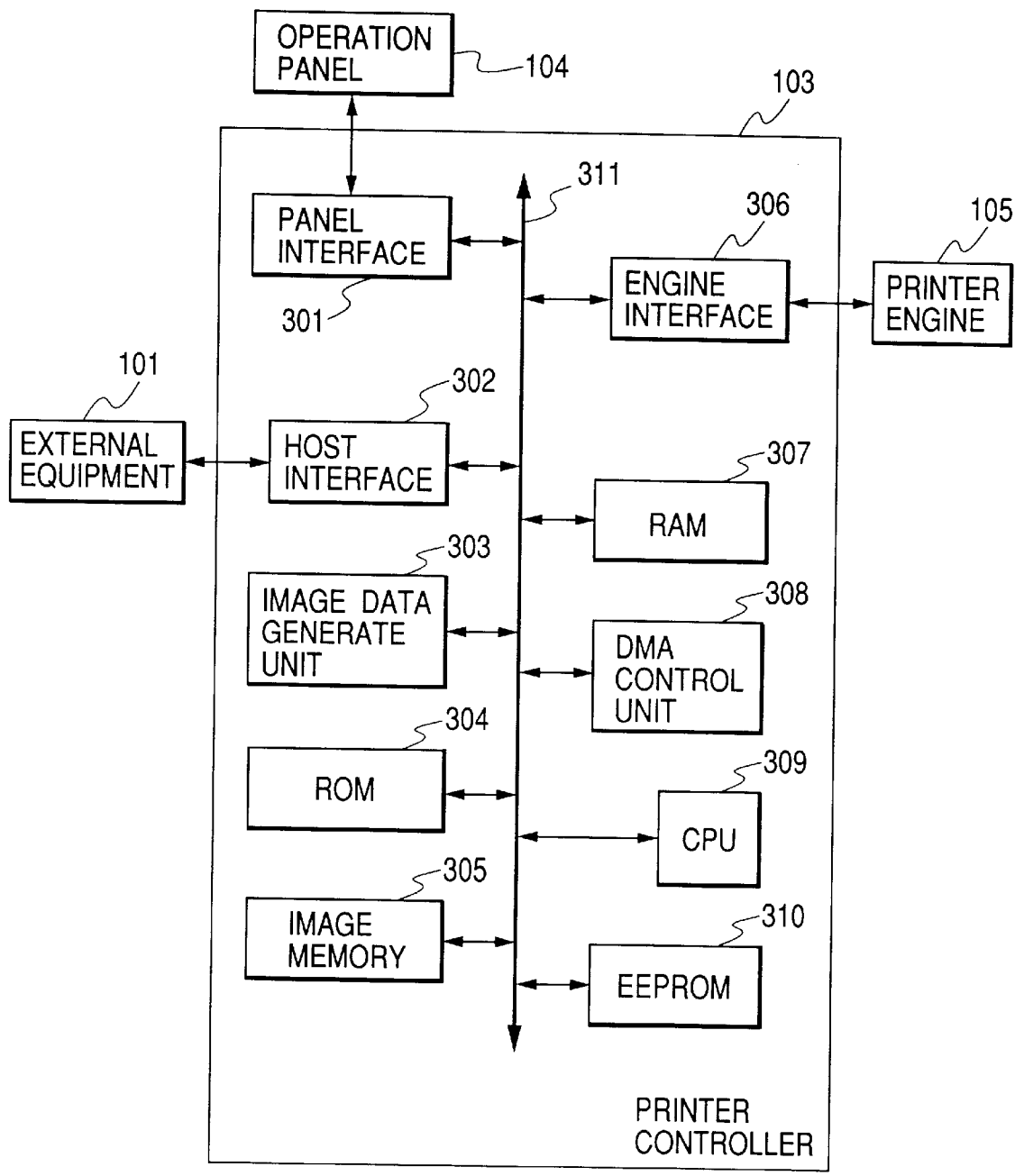
FIG. 18 is a block diagram showing a structural example of a printer controller.

FIG. 18 is a block diagram showing a structural example of the printer controller 103.

The printer controller 103 has a host interface 302 which has an input buffer (not shown) for momentarily storing the print data inputted from the external device 101 and an output buffer (not shown) for momentarily storing a signal which is to be transmitted to the external device 101. The host interface 302 composes an input/output unit for inputting and outputting a signal which is communicated between the host interface 302 and the external device 101 and controls a communication therebetween.

The print data inputted through the host interface 302 is supplied to an image data generation unit 303. The image data generation unit 303 analyzes the print data on the basis of a predetermined analyzing procedure. As this analyzing, for example, there has been known a PDL analyzing process. The image data generation unit 303 produces image data which can be processed by the printer engine 105 on the basis of the analyzed result.

More particularly, the PDL analyzing process is such a process as analyzing the print data and produces object information on the basis of the analyzed result. A rasterizing process, the pseudo halftone processing or the like is sequentially executed simultaneously with the generating of the object information. The rasterizing process includes a process for converting data of R, G and B contained in the print data into data of Y, M, C and K which can be processed by the printer engine 105 and a process for converting character codes contained in the print data into font data such as pre-stored bit patterns, an outline font or the like. Further, in the rasterizing process, bit map data is produced with a band unit of predetermined width and the pseudo halftone processing such as the dither processing, an error diffusion processing or the like is executed to the bit map data of band unit to generate image data which can be printed.

The image data generated in this manner is stored in an image memory 305. The image data stored in the image memory 305 is read out by a DMA control unit 308 whose operation follows an instruction from a CPU 309.

The image data which is read out from the image memory 305 is transferred to the printer engine 105 as a video signal through an engine interface 306. The engine interface 306 has an output buffer (not shown) for momentarily storing the video signal which is to be transmitted to the printer engine 105 and an input buffer (not shown) for momentarily storing a signal transmitted from the printer engine 105. The engine interface 306 composes an input/output unit for inputting and outputting a signal which is communicated between the engine interface 306 and the printer engine 105 and controls communication therebetween.

A panel interface 301 constitutes an interface between an operation panel 104 and the CPU 309. A setting instruction or the like concerning an operation mode of a printer inputted from the operation panel 104 is inputted to the CPU 309 through the panel interface 301 and a system bus 311.

The CPU 309 controls the above-mentioned each block in accordance with a control program stored in a ROM 304 on the basis of the instructions from the operation panel 104 and the external device 101. The control program stored in the ROM 304 is constituted by an operating system (OS) for performing a time-divisional control with a unit of a load module called as a task by a system clock and a plurality of load modules controlled with a unit of function by this OS. The control program which includes the load modules is stored in a non-volatile memory 310 such as an EEPROM in accordance with a requirement. The CPU uses a RAM 307 as a work area for calculating processes.

Each block including the above-mentioned CPU 309 is mutually connected through the system bus 311 composed of an address bus and a data bus.

Figure 19:
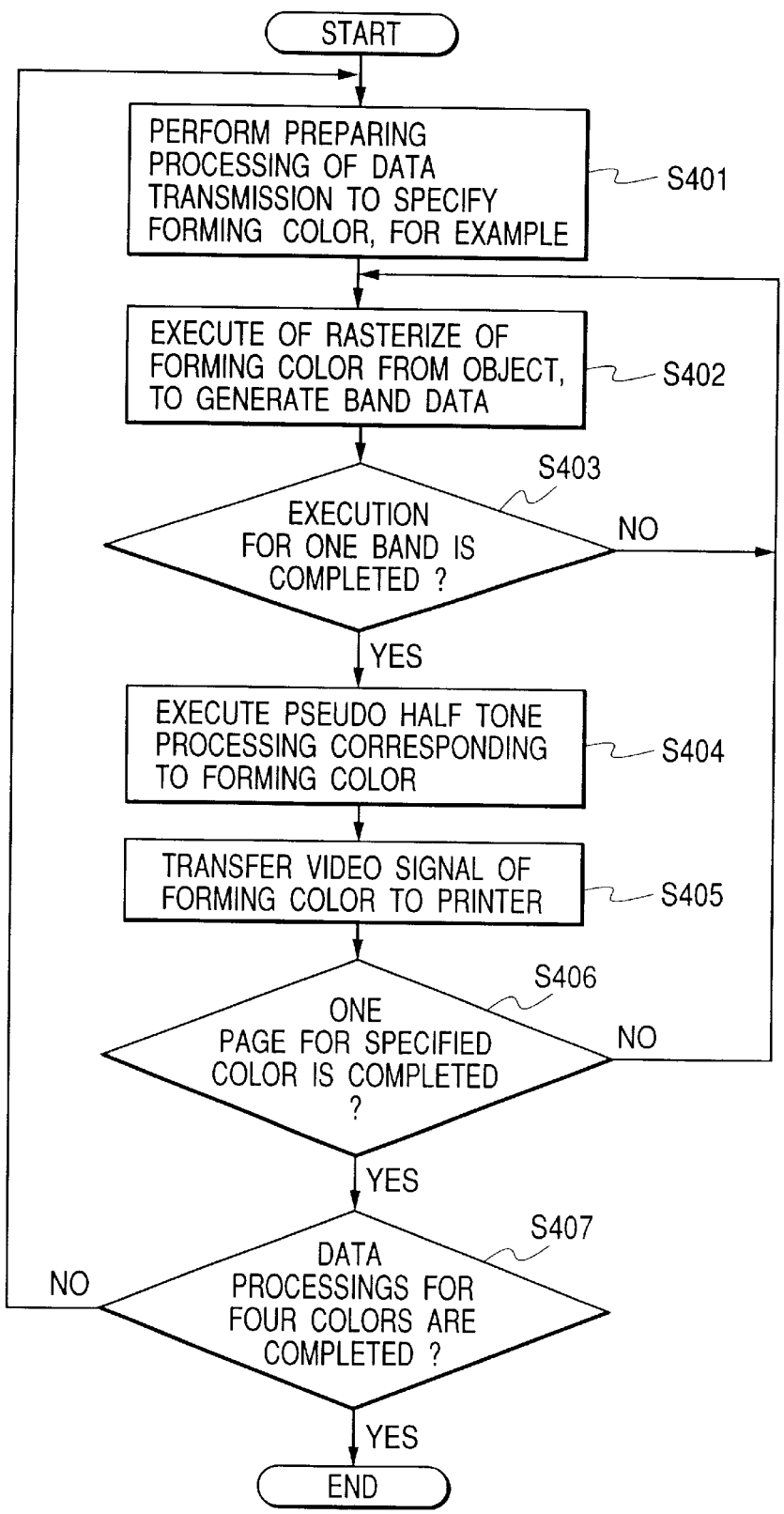
FIG. 19 is a flow chart showing an example of procedure of generating a video signal and transmitting it depending on the printer controller.

FIG. 19 is a flow chart showing an example of a procedure for generating the video signal by the printer controller 103 and transmitting it.

When the print data is inputted to the printer controller 103 from the external device 101, the process is executed to generate the object information for performing a graphic drawing. The PDL analyzing process is continued as long as input data exists for continuously generating the object information.

The rasterizing process shown in FIG. 19 is executed simultaneously with a generation process for generating this object information. In a step S401, a preparation process for transferring data to the printer engine 105 is executed before executing the rasterizing process. In this preparation process, a designation of formation color, a designation of toner density and other designations are performed for the printer engine 105. In this embodiment, the designation of formation color is performed in the order of M, C, Y and K. The designating order of the forming color depends on the printer engine 105.

In a step S402, the rasterizing process is executed on the basis of the generated objection information and band data of a predetermined line width is generated. In a step S403, if it is confirmed that the band data of one band is generated, the pseudo halftone processing using a dither pattern corresponding to the formation color is executed in a step S404. The video signal corresponding to the forming color is transmitted to the printer engine 105 in a step S405.

Next, in a step S406, it is judged whether or not a data processing corresponding to the forming color for one page is terminated. If it is not terminated, the flow returns to the step S402 and the process from the step S402 to the step S405 is repeated until terminating the data processing corresponding to the forming color for one page.

In a case where the data processing corresponding to the forming color for one page is terminated, it is judged whether or not the data processing corresponding to all of colors M, C, Y and K is terminated in a step S407. If it is not terminated, the flow returns to the step S401 and the process from the step S401 to the step S406 is repeated until terminating the data processing corresponding to four colors. When the data processing corresponding to four colors is terminated, the process in the flow is terminated.

Figure 20:
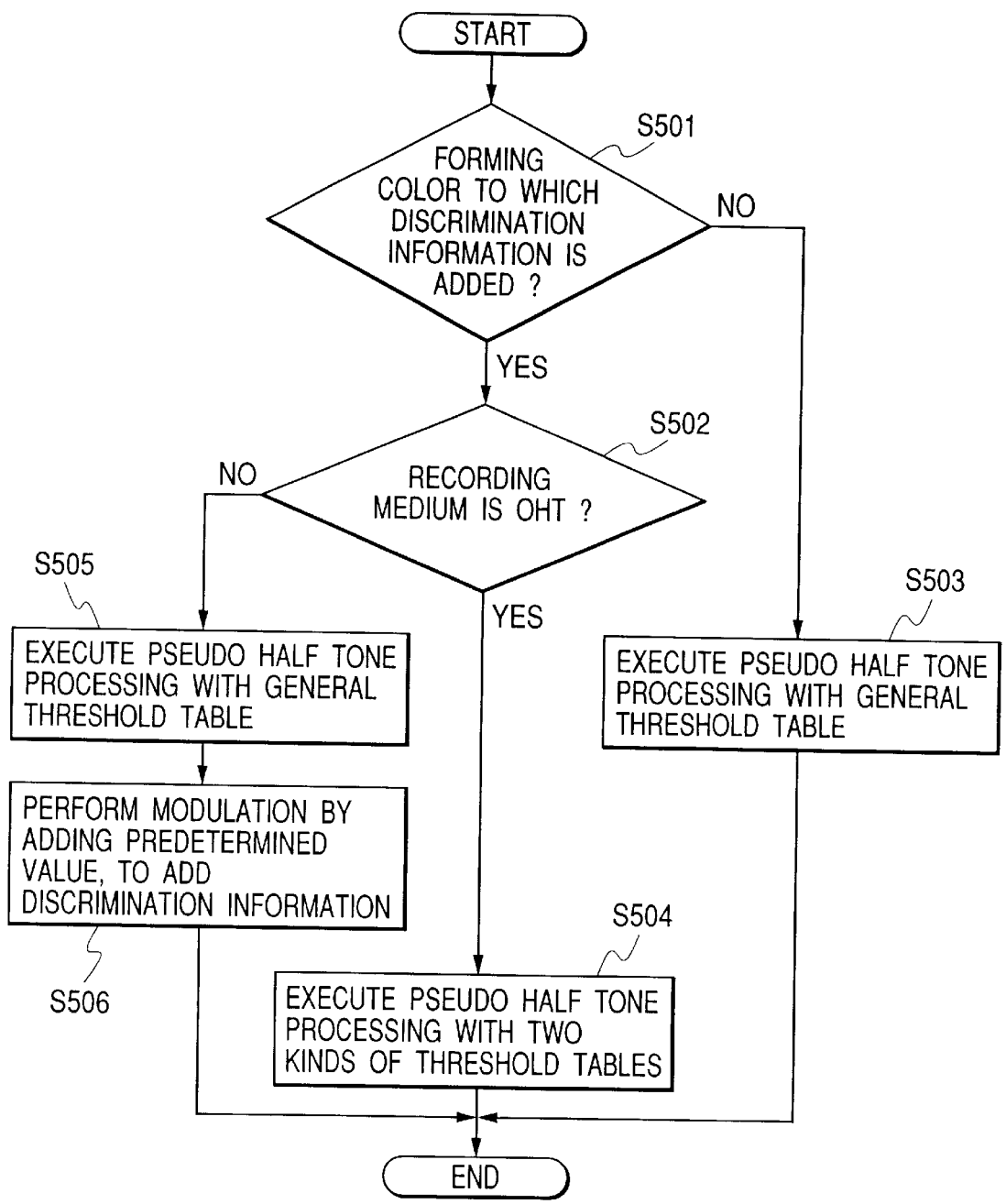
FIG. 20 is a flow chart showing an example of processing procedure for adding additional information to an image to detect a forgery.

FIG. 20 is a flow chart showing an example of the processing procedure for adding the additional information used for determining forgery. This process, which corresponds to the process in the step S404 in FIG. 19, is executed by the CPU 309.

In this embodiment, an adding method for adding the additional information is switched in accordance with the kind of supplied recording medium. It is assumed that, especially, the additional information is only added on a specific recording medium by switching the threshold tables in performing of the pseudo halftone processing. The switching method of the threshold tables is fundamentally the same as that in the above-mentioned first to third embodiments. The additional information is added by performing a modulation for adding a predetermined value to an image signal of a color component which is the most difficult to be perceived by the human eye (e.g., yellow) within color components (e.g., C, M, Y and K) of an output image.

In a step S501 in FIG. 5, it is examined whether color data to be processed is data of color component to which the additional information is added. If it is not, the pseudo halftone processing by means of the general dither processing is executed in a step S503.

In case of the data of color component to which the additional information is added, the kind of recording medium to be supplied is examined in a step S502. If it is an OHT (Overhead Transparency) being a transparent recording medium used for an overhead projector, the pseudo halftone processing using two kinds of the threshold tables to express the additional information is executed in a step S504 in order to prevent prominence of the additional information. That is, only in case of the OHT, the additional information is added by such a method as described in each of the first to third embodiments. If the recording medium to be supplied is not the OHT, the additional information is added by executing the general pseudo halftone processing in the step S503 and sequentially performing the conventionally known one of the adding methods, that is, which is a modulation for merely adding the predetermined value to an image after executing the pseudo halftone processing, in a step S506. The same pseudo halftone processing is executed in steps S503 and S505.

In this manner, the CPU 309 selects an appropriate adding method for adding the additional information in accordance with the kind of recording medium to be supplied. The kind of recording medium may be judged by an output signal from a light transmission type sensor or a light reflection type sensor (not shown) in the vicinity of the resist shutter 214.

A technique for executing the pseudo halftone processing by using two kinds of threshold tables so as to add the additional information, that is, the technique for adding the additional information by expressing information depending on the switching method of the two kinds of the threshold tables will be described. In a screening process, as in the first to third embodiments, it is assumed that one of the values 0 to 255 is inputted as a gradation value by treating a pixel block composed of 8×8 pixels as a processing unit.

In this embodiment, only in case of recording an image on the OHT, the additional information is added to this image by switching the threshold tables used for producing a pseudo halftone image. That is, the pseudo halftone image having different pixel growing patterns is formed by switching the threshold tables in FIGS. 21 and 22 used for producing the pseudo halftone image (image after performing the dither processing) so that the additional information is indicated. Consequently, by analyzing the switching manner of the threshold tables, from the pseudo halftone image formed on the OHT, the additional information which is added to this image can be extracted.

It is assumed that each of the threshold tables shown in FIGS. 21 and 22 has the size of 8×8 pixels and the dither processing is sequentially executed to the inputted image data. In this embodiment, in a case where the threshold table shown in FIG. 21 is used, 0 is indicated. In a case where the threshold table shown in FIG. 22 is used, 1 is indicated. Accordingly, the additional information of one bit can be added to every area of 8×8 pixels in an image. In this embodiment, if the additional information to be added is data of 16 bits, an area corresponding to the threshold tables of 16 pieces is required. It should be noted that an expressing manner of the additional information is not limited to this manner, but may be expressed, without treating one bit information of 0 or 1 indicated by the threshold tables shown in FIGS. 21 and 22 as a part of the additional information as it is, by the manner of run-length using 0 and 1. On the other hand, in this embodiment, an area for adding the additional information to an image of one frame is not treated as an entire image, but an additional area (area for switching the threshold tables shown in FIGS. 21 and 22) is to be assigned at a fixed period. However, the present invention is not limited to this, but the additional area may be assigned to an entire image.

Figure 23:
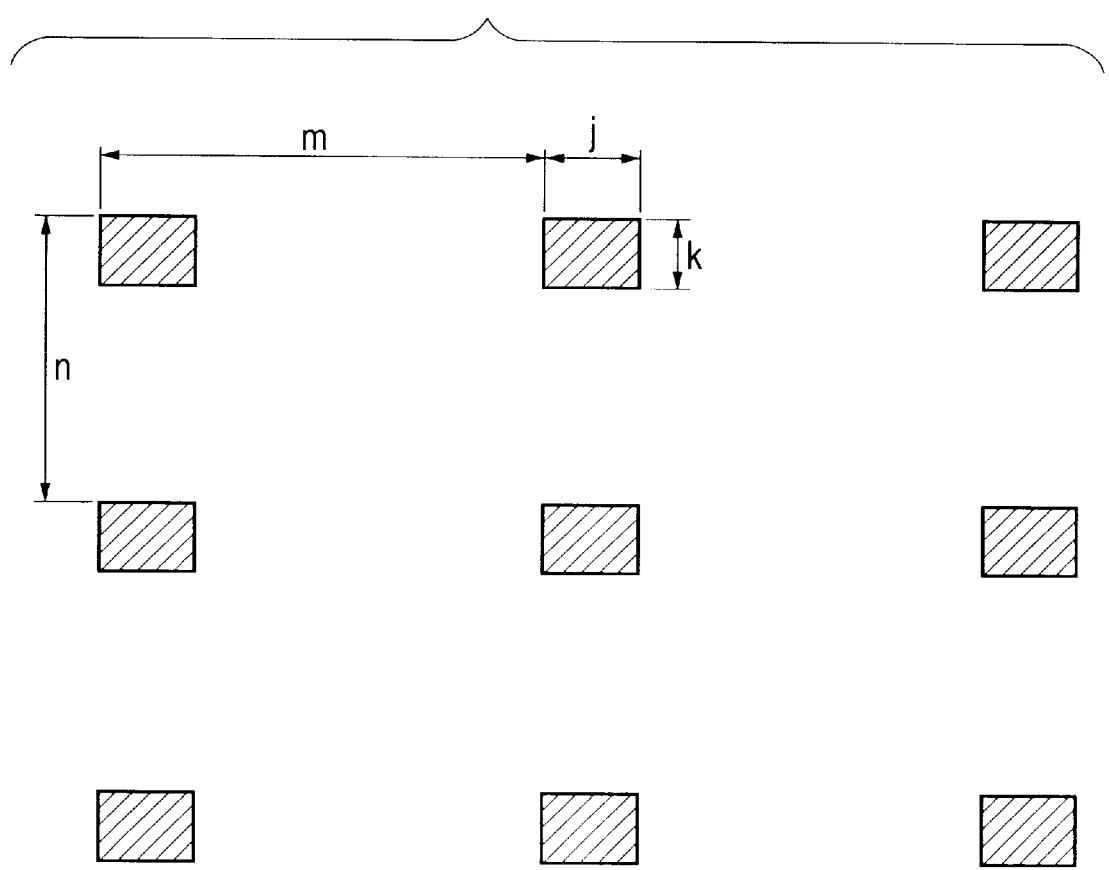
FIG. 23 indicates a positional example of area to which the additional information on an image is added.

Next, the state of assigning manner of the above-mentioned additional area in this embodiment is shown in FIG. 23. In FIG. 23, areas of oblique lines are additional areas. That is, the additional information (in this embodiment, 16 bits) has to be put on these areas by switching the threshold tables shown in FIGS. 21 and 22. The additional area has the size of containing j×k threshold tables (in this embodiment, j=4 and k=4). That is, each of the additional areas can express the additional information of j×k bits. As to the positional relation of each area among the additional areas, it is assumed that length m and length n in FIG. 23 have distance capable of containing the threshold tables of 16 pieces (8×16 pixels).

Figure 24:
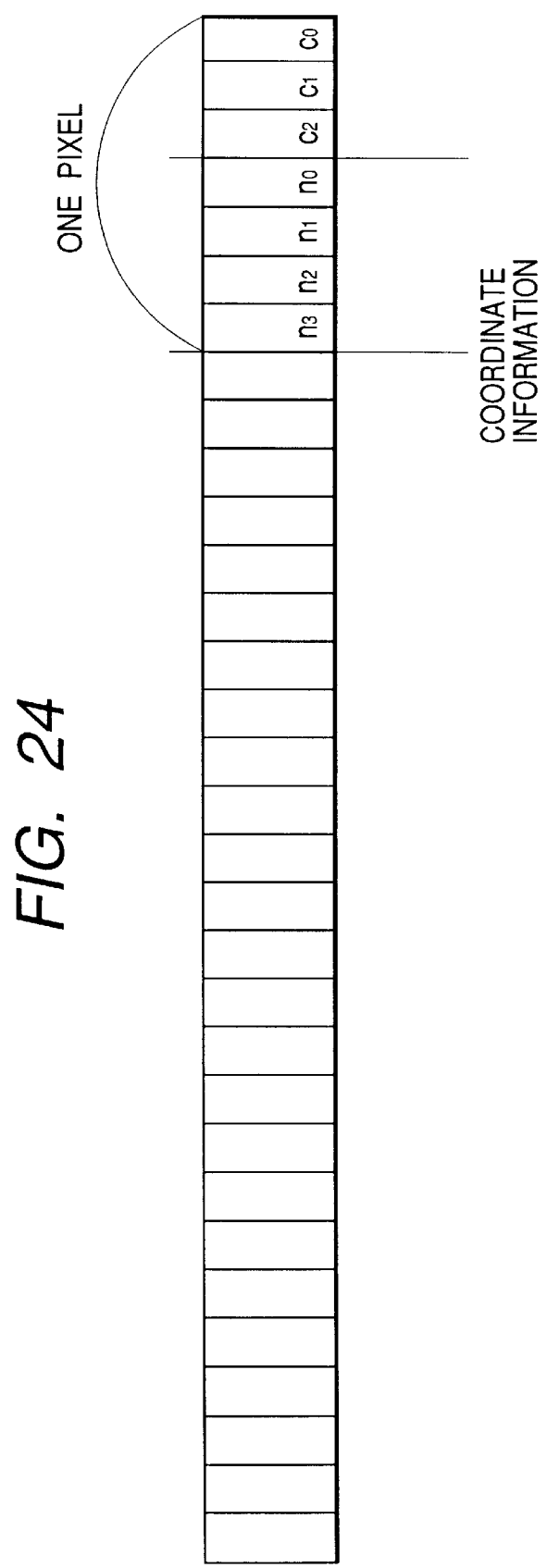
FIG. 24 indicates an assigning example of information according to a column position in coordinate information.

FIG. 24 indicates the state of a bit column indicating a coordinate in each pixel of an image in the image processing unit. As mentioned above, by setting each parameter as a multiplier of 2, a coordinate value expressed in binary number can be easily treated as shown in FIG. 24. In FIG. 24, three bits of the lowest order unit ($c_2$, $c_1$, $c_0$) is the coordinate indicating a position within each of the threshold tables. When two bits of upper order ($n_3$, $n_2$) within four bits ($n_3$, $n_2$, $n_1$, $n_0$) adjoining the three bits of the lowest order unit corresponds to specific values (in this embodiment, $n_3=1$, $n_2=1$), since such a threshold table as indicating the additional information of 16 bits may have to be selected, it becomes possible to perform a high-speed processing. In this embodiment, the threshold table shown in FIG. 21 is unconditionally used for an area other than areas of oblique lines (additional areas) shown in FIG. 23.

Figure 25:
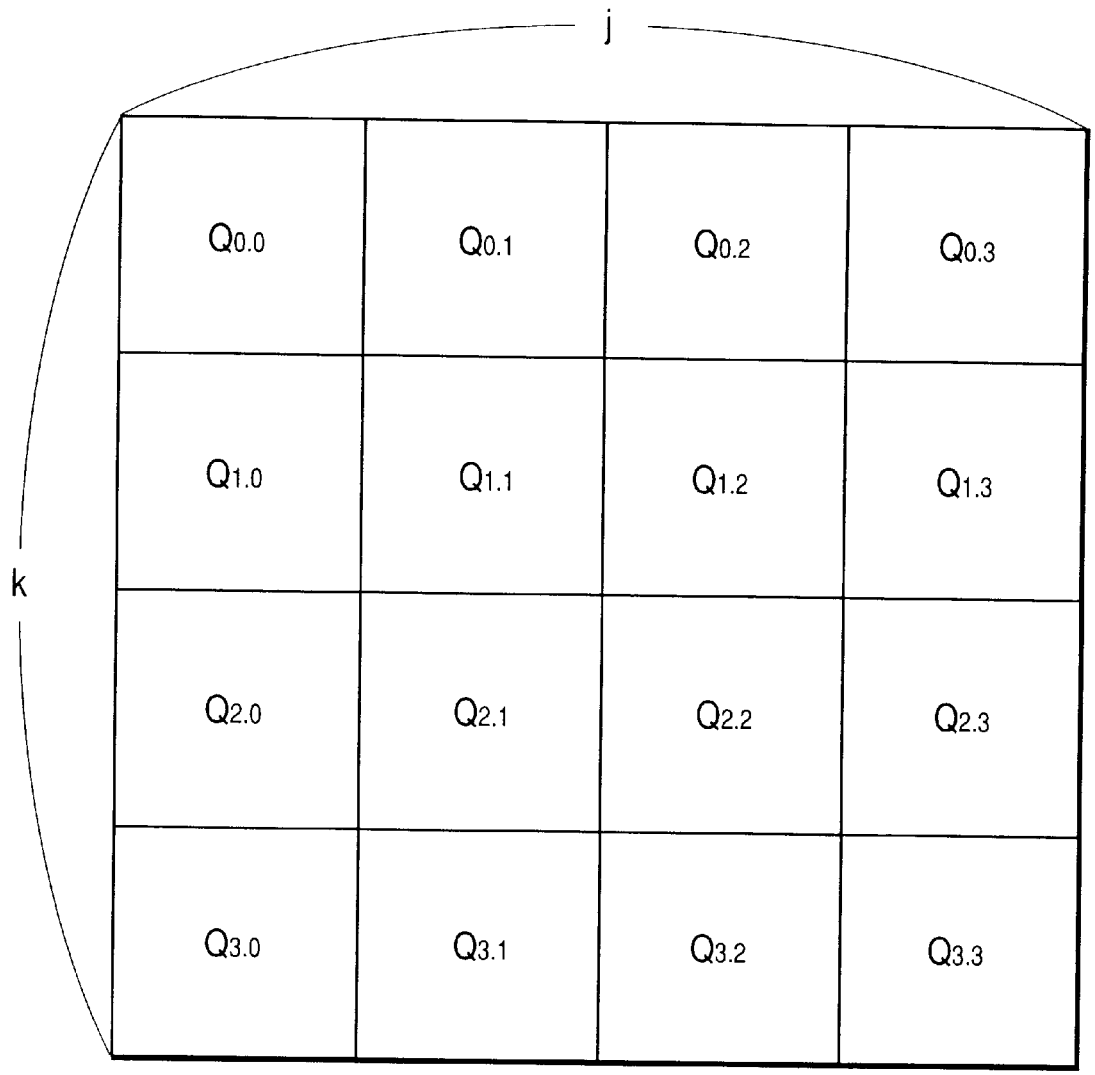
FIG. 25 indicates an assigning example of information according to the column position in the coordinate information.

FIG. 25 indicates the state of threshold tables of 16 pieces $Q_{0,0}$ to $Q_{3,3}$ in each of the additional areas and the state of the additional information is expressed by aligning each of bit information $q_{0,0}$ to $q_{3,3}$ represented by each of the threshold tables. As shown in FIG. 25, the threshold tables $Q_{0,0}$ to $Q_{3,3}$ are assigned to each of the additional areas. The threshold table shown in FIG. 21 or 22 is used for each of these tables $Q_{0,0}$ to $Q_{3,3}$. Therefore, the additional information is expressed by aligning the bit information $q_{0,0}$ to $q_{3,3}$ being the value of 0 or 1 represented by the threshold tables $Q_{0,0}$ to $Q_{3,3}$.

Figure 26:
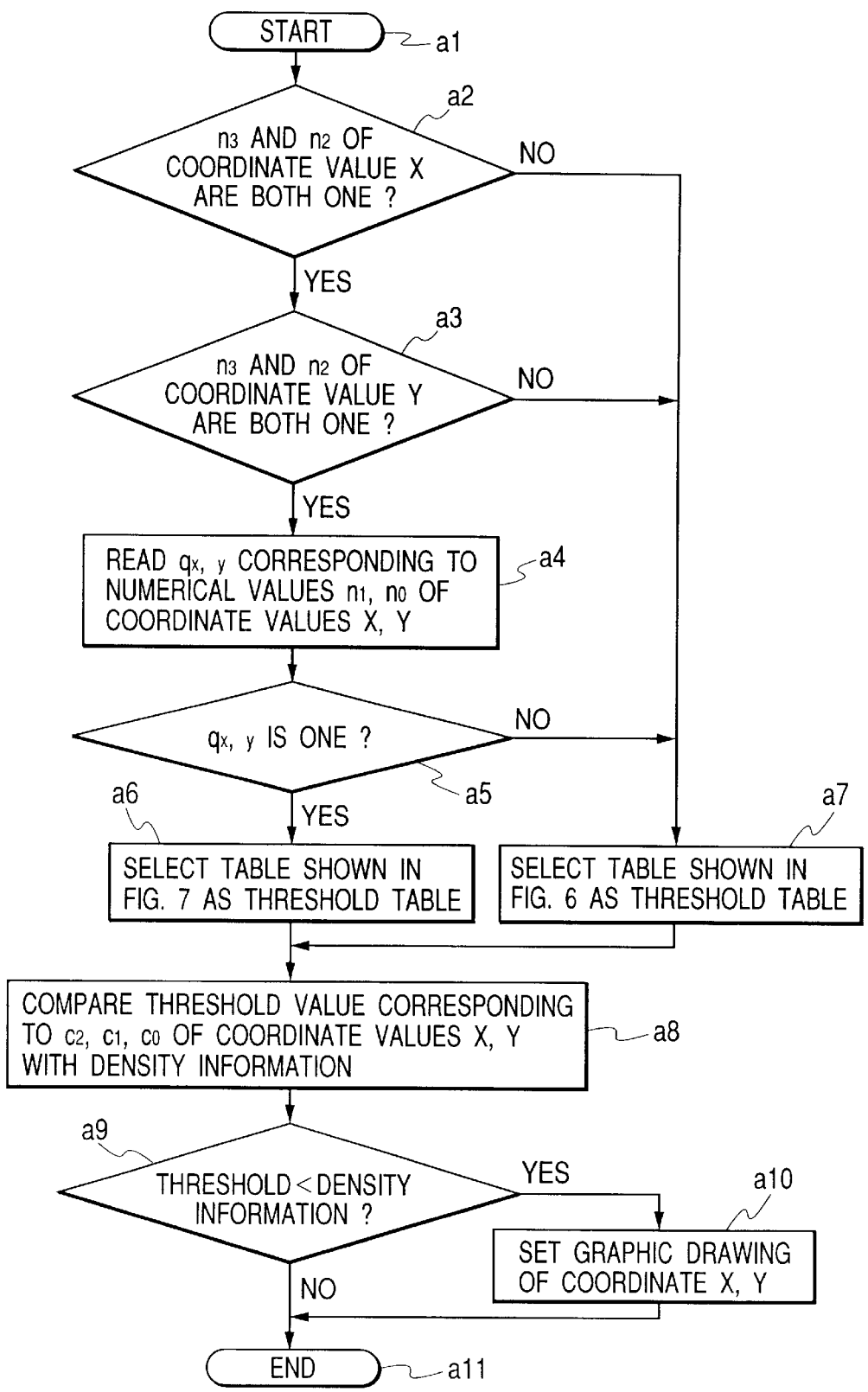
FIG. 26 is a flow chart showing an example of density processing for a designated X-Y coordinate.

FIG. 26 indicates a procedure for pseudo half processing a pixel corresponded to coordinates X, Y. In a step a2, as to a coordinate value X, it is judged whether each of $n_3$ and $n_2$ is 1 or not. If each of $n_3$ and $n_2$ is not 1, the flow advances to a step a7. If each of $n_3$ and $n_2$ is 1, the flow advances to a step a3. Next, in the step a3, as to a coordinate value Y, it is judged whether each of $n_3$ and $n_2$ is 1 or not. If each of $n_3$ and $n_2$ is not 1, the flow advances to the step a7. If both of $n_3$ and $n_2$ are 1, the flow advances to a step a4. In the step a4, either of bit information $q_{0,0}$ to $q_{3,3}$ corresponding to numerical values $n_1$ and $n_0$ of the coordinate values X and Y are read. In a step a5, it is judged whether or not the bit information $q_{0,0}$ to $q_{3,3}$ which are read are 1. If the judged result does not obtain 1, the flow advances to the step a7. If the judged result obtains 1, the flow advances to a step a6.

In the step a6, it is set to perform the pseudo halftone processing by using the threshold table shown in FIG. 22, that is, the table of indicating 1. On the other hand, in the step a7, it is set to perform the pseudo halftone processing by using the threshold table shown in FIG. 21, that is, the table of indicating 0. In a step a8, density information (pixel value) of the coordinate values X and Y is compared with the thresholds corresponding to the numerical values $c_2$, $c_1$ and $c_0$ which indicate this coordinate values. In a step a9, in a case where the threshold is smaller than the density information as the result in the step a8, the flow advances to a step a10. If the threshold is not smaller than the density information, the pixel for graphic drawing the coordinate values X and Y is disregarded and the flow ends in a step a11. In the step a10, the coordinate values X and Y are set as the pixel for performing a graphic drawing, thereafter, the flow ends in the step a11.

In this embodiment, in case of recording an image on the OHT, although the additional information of one bit is to be added on within an area corresponding to one threshold table by switching two threshold tables, the present invention is not limited to this manner. For example, the present invention includes the case for adding the additional information of more than two bits on every area corresponding to one threshold table by use of switching four or more threshold tables.

Although the adding method for adding the additional information as in the first to third embodiments is especially used only when image data is recorded on the OHP, the above-mentioned process may be executed only when the image data is recorded on a coated paper.

In the above description, because of a high-speed processing, the values of $2^n$ (n: positive integer) are used as various parameters so as to realize various judgements by cutting out the bits. However, the values of positive integer can be used as these values if permitting the loss of time used for a calculating process.

Further, in the above description, an example of preparing only the two threshold tables used in case of executing the pseudo halftone processing is described. However, it becomes possible to put the additional information by shifting each of growing dots of pixels in the different direction.

In this manner, according to this embodiment, for example, in case of forming an image on a specific recording medium such as the OHT, the additional information is added by putting the additional information depending on the switching manner of the threshold tables which indicate the growing patterns of screen aiming at the screening process in a pseudo halftone expression. As a result, the additional information can be added by a method according to the kind of recording medium and the deterioration of quality of an output image can be prevented, while maintaining the detectability of the additional information.

In the following, an image processing apparatus in a fifth embodiment according to the present invention will be described. In this embodiment, the same structure as that in the fourth embodiment has the same reference numeral and the description thereof will be omitted.

FIG. 27 is a flow chart showing an example of the procedure for generating a video signal by the printer controller 103 and transmitting it. The same processing step as that in the flow chart shown in FIG. 19 has the same reference numeral and the description thereof will be omitted. In a step S701, it is judged whether or not it is a forming color, to which the additional information is added, after executing the pseudo halftone processing in the step S404. In case of the forming color, a forming pattern of the additional information is selected in a step S702 and a process for adding the additional information depending on the selected forming pattern is executed in a step S703. In the step S701, if it is judged that it is not the forming color to which the additional information is added, a process in the step S405 is executed.

FIG. 28 is a flow chart showing an example of the procedure, which corresponds to the process in the step S702, for selecting the additional information in accordance with a characteristic of the recording medium.

In the step S501, the characteristic of the recording medium supplied from the paper feeding cassette 210 or the manual feeding tray 219 is analyzed. That is, as in an example shown in FIG. 29, the ROM 304 or the EEPROM 310 stores a table in which data indicating the characteristic of the recording medium is registered. The characteristic of the recording medium can be analyzed by comparing the data stored in this table with an output from a sensor. Here, if a fixing characteristic is explained, the recording medium has various kinds of papers such as a plain paper, a special purpose paper, a second base paper, a card or the like and the fixing characteristic of a toner becomes a different condition due to a characteristic of the surface of a paper. Since the reflection of light becomes a different condition due to the characteristic of surface of the paper, if data indicating the reflection condition of light is stored in the table, the characteristic of the supplied recording medium can be analyzed by the output signal from the sensor.

The kind of supplied recording medium is judged in the step S502 on the basis of the characteristic of the recording medium analyzed in the step S501. For example, in a case where the recording medium is judged as the card, since the supplied recording medium has an inferior fixing characteristic of the toner, the additional information used for determining the forgery becomes difficult to be detected. Therefore, it is required to select a forming pattern of remarkable additional information to maintain the detectability. Accordingly, in the step S503, a forming pattern of the most suitable additional information is selected in accordance with the kind of judged recording medium.

Figure 30:
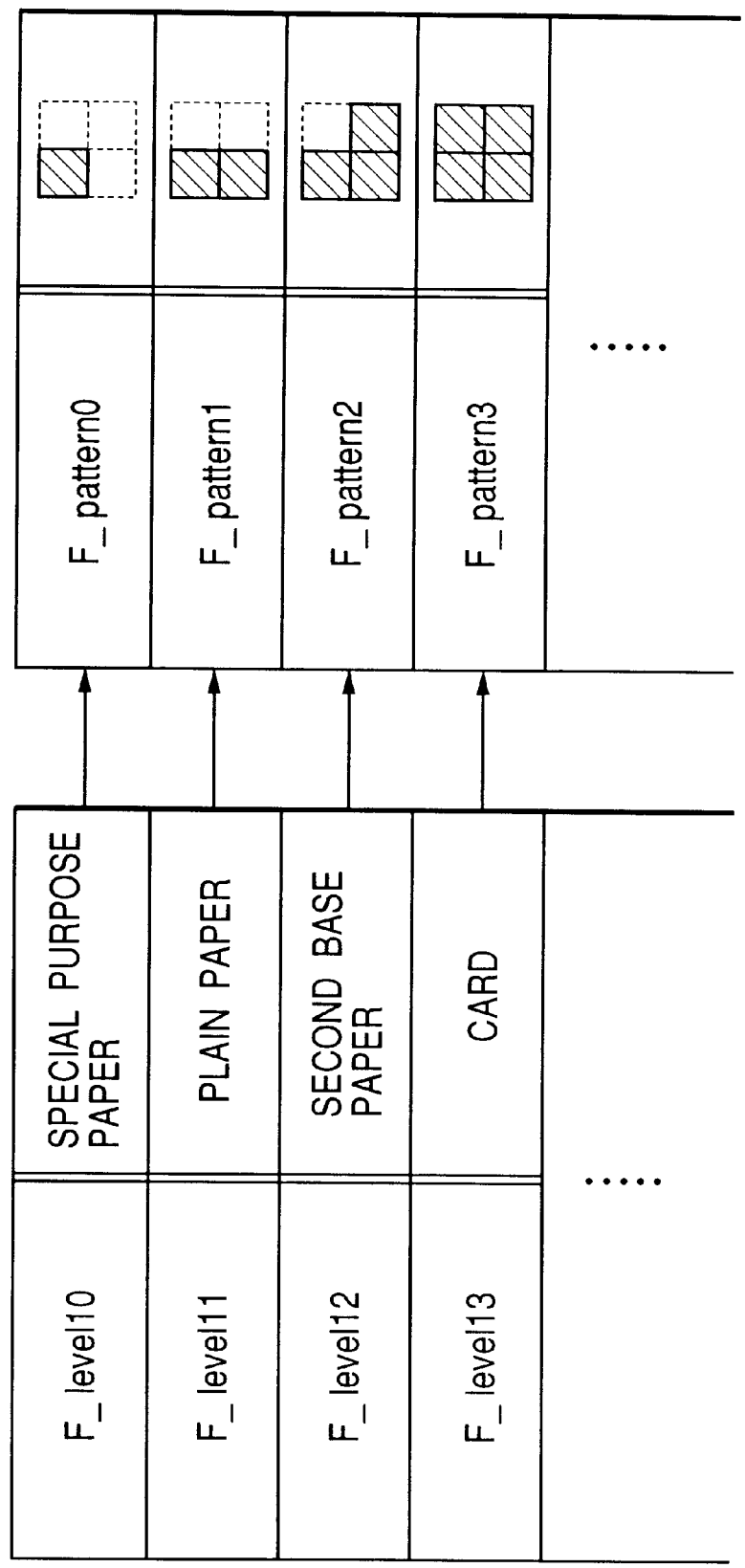
FIG. 30 indicates a corresponding example between the kind of a recording medium and a pattern of the additional information.
Figure 31:
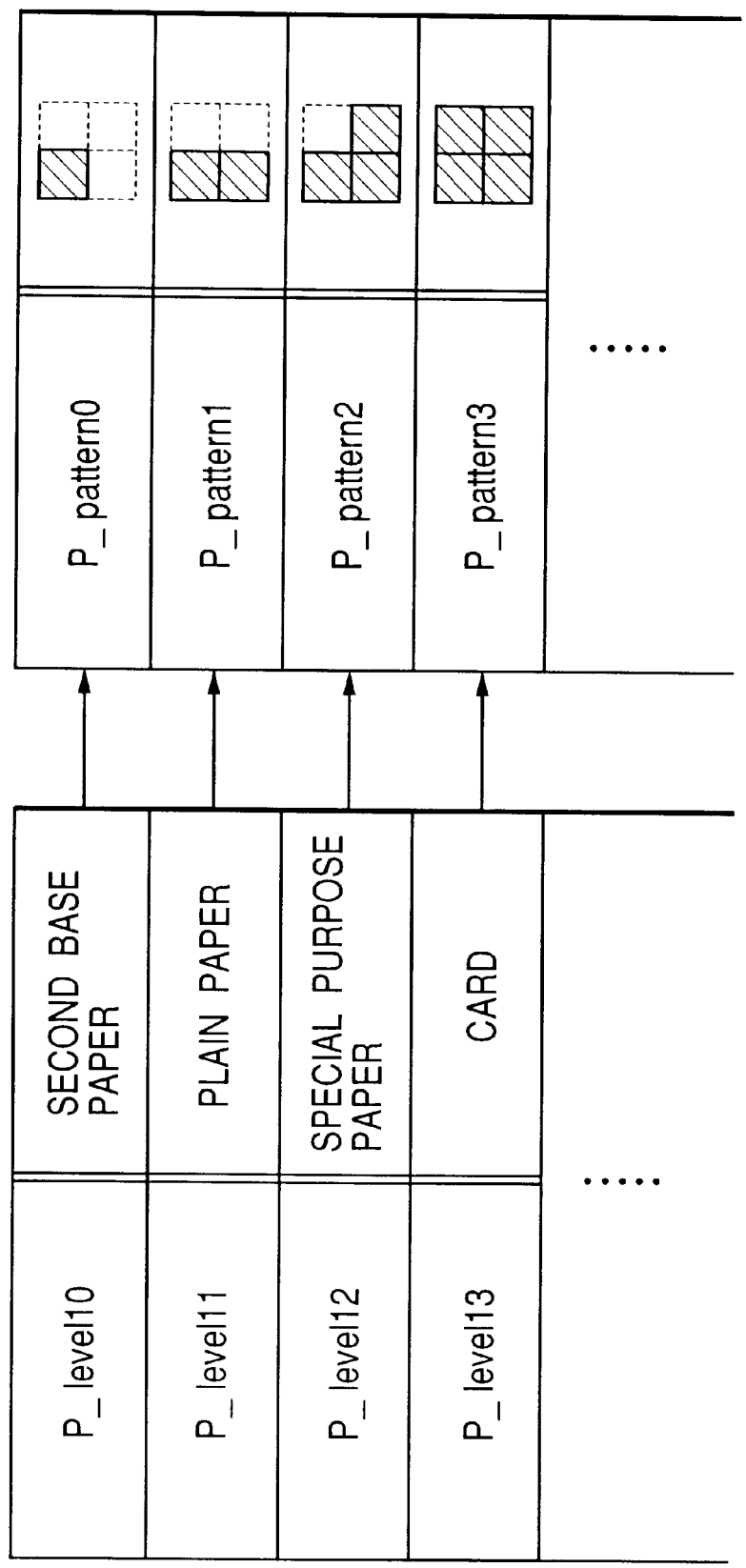
FIG. 31 indicates a corresponding example between the kind of a recording medium and a pattern of the additional information.

FIGS. 30 and 31 indicate corresponding examples between the kinds of recording medium and forming patterns of the additional information. For example, in case of the card, as shown in FIG. 30, a fixing characteristic of F_level corresponds to 3 and a forming pattern of the additional information of F_pattern 3, which corresponds to the same level as that in the fixing characteristic, is selected. That is, since the forming pattern of the additional information, which is used for determining the forgery, is difficult to be fixed on the recording medium having the inferior fixing characteristic such as the card, a large forming pattern is selected.

On the contrary, in a case where the recording medium is judged as the recording medium having a superior fixing characteristic of the toner such as the special purpose paper, whose fixing characteristic of F_level corresponds to 0, a forming pattern of F_pattern 0 corresponding to F_level 0 is selected in order to suppress the deterioration of image quality by reducing the level of the forming pattern of the additional information.

In a case where the recording medium is judged as the recording medium having a high transmittance such as the second base paper, as shown in FIG. 31, transmittance of P_level corresponds to 0 and a forming pattern of the additional information of P_pattern 0, which corresponds to the same level as that in the transmittance, is selected. That is, since the additional information, which is used for determining the forgery, becomes remarkable on the recording medium having the high transmittance such as the second base paper, the quality of the an output image deteriorates. Therefore, the forming pattern of the additional information, which is not remarkable, is selected.

In a case where the recording medium is judged as the recording medium having a comparatively low transmittance such as the special purpose paper of which transmittance of P_level corresponds to 2, a forming pattern of the additional information of P_pattern 2 corresponding to P_level 2 is selected in order to select and add the pattern of the additional information which is difficult to be detected.

As to the F_pattern and the P_pattern, of which priority may be previously set to select the F_pattern or the P_pattern. Besides, it may be set in accordance with a result of recognizing an image which is to be formed on the recording medium. As a result of recognizing an image, as similarity between an image to be formed and an image of a specific original prohibited to copy becomes closer, it may be set that a detectable forming pattern is prior to other patterns.

Of course, various analyzing items and various forming patterns of the additional information concerning the recording medium may be optionally set. That is, the present invention is not limited to such tables as shown in FIGS. 29, 30 and 31.

As described, according to the present invention, it becomes possible to select and add a forming pattern of the suitable additional information which responds to the judged kind of recording medium by judging the kind of the recording medium under analyzing of the characteristic of the recording medium to be supplied.

In each of the above-mentioned embodiments, although an example of selecting the forming pattern of the additional information is described, as to an adjustment of the forming pattern, there includes such adjustments as changing an additional form of the forming pattern, changing an adding method of the forming pattern, changing additional density of the forming pattern and changing a color of development agent used for adding the forming pattern. For example, in a case where it is judged that the characteristic of the recording medium to be supplied is an inferior fixing characteristic, if the additional density of the forming pattern of the general additional information maintains a level of ten percent, such a process as increasing the additional density to fifty percent can be executed in order to maintain the detectability of the additional information.

It should be noted that the present invention is not limited to the above-mentioned embodiments, but may be applied to a system composed of a plurality of devices (e.g., host computer, interface unit, reader, printer or the like) or to an apparatus composed of one device (e.g., copying machine, facsimile apparatus or the like).

It is needless to say that an object of the present invention is attained by supplying a storing medium which stores a program code of software to realize the functions in the above-mentioned embodiments to a system or an apparatus, and also the system or a computer (CPU or MPU) in the apparatus reads out the program code stored in the storing medium to execute it. In this case, the program code itself, which is read out from the storing medium, realizes the functions in the above-mentioned embodiments, and the storing medium which stores the program code constitutes the present invention. As the storing medium for supplying the program code, for example, a floppy disk, a hard disk, an optical disk, a magneto-optical disk, a CD-ROM, a CD-R, a CD-R/W, a DVD-ROM, a DVD-RAM, a magnetic tape, a non-volatile memory card, a ROM or the like can be used.

Also, it is needless to say that the present invention includes not only the case for realizing the functions in the above-mentioned embodiments by executing the program code which is read out by the computer but the case for realizing the functions in the above-mentioned embodiments by such a process as an OS (operating system) or the like operated in the computer executes all or a part of an actual processing on the basis of an instruction of the program code.

Further, it is needless to say that the present invention includes the case for realizing the functions in the above-mentioned embodiments by such a process as a CPU or the like provided in a function expanding card or a function expanding unit executes all or a part of the actual processing on the basis of an instruction of the program code after the program code which is read out from the storing medium is written in a memory provided in the function expanding card inserted to the computer or the function expanding unit connected to the computer.

As described above, according to the present invention, since a processing method in the pseudo halftone processing used for a general image formation is to be selected by a switching method according to the additional information, as a result, the switching process itself becomes to put the additional information. Consequently, it is not required to provide specific adding means for adding the additional information.

The present invention can be modified in various manners, within the scope of the following claims.

What is claimed is:

1. An image processing apparatus comprising:

input means for inputting M-value image data; and

N-value generation means for converting the M-value image data inputted by said input means into N-value image data, wherein the value M is larger than the value N, and wherein said N-value generation means controls whether or not M-value image data is converted into N-value image data by using plural kinds of threshold tables whose using order is determined so as to indicate predetermined additional information to be embedded in an image according to a kind of recording medium on which an image indicative of M-value image data input by said input means is formed.

2. An apparatus according to claim 1, wherein the M-value image data is 256-value image data.

3. An apparatus according to claim 1, wherein the N-value image data is binary image data.

4. An apparatus according to claim 1, wherein the threshold table is used for a dither processing and said N-value generation means converts the M-value image data into the N-value image data by executing the dither processing.

5. An apparatus according to claim 1, wherein the apparatus further comprises printing means for printing the N-value image data obtained by the conversion performed by said N-value generation means.

6. An apparatus according to claim 5, wherein said printing means is an ink jet printer.

7. An apparatus according to claim 5, wherein said printing means is a laser beam printer.

8. An apparatus according to claim 1, wherein the apparatus further comprises reading means for reading an original to generate the M-value image data.

9. An apparatus according to claim 1, wherein each of the plural kinds of threshold tables is a dither matrix having a size of m×n pixels and the plural kinds of threshold tables are different from each other concerning the construction of thresholds of m×n pieces which construct the dither matrix.

10. An apparatus according to claim 1, wherein the M-value image data contains a plurality of color components and said N-value generation means converts the M-value image data into the N-value image data for only one color of the plural color components on the basis of the threshold table groups composed of the plural kinds of threshold tables.

11. An image processing method comprising the steps of:

inputting M-value image data; and converting the M-value image data inputted in said input step into N-value image data, wherein the value M is larger than the value N, and wherein said converting step controls whether or not M-value image data is converted into N-value image data by using plural kinds of threshold tables whose using order is determined so as to indicate predetermined additional information to be embedded in an image according to a kind of recording medium on which an image indicative of M-value image data input by said input means is formed.

12. A storage medium storing a computer readable image processing program, the image processing program comprising the steps of:

inputting M-value image data; and converting the M-value image data inputted in said input step into N-value image data, wherein the value M is larger than the value N, and wherein said converting step controls whether or not M-value image data is converted into N-value image data by using plural kinds of threshold tables whose using order is determined so as to indicate predetermined additional information to be embedded in an image according to a kind of recording medium on which an image indicative of M-value image data input by said input means is formed.

* * * * *